US011970007B2

(12) United States Patent
Miyauchi et al.

(10) Patent No.: US 11,970,007 B2
(45) Date of Patent: Apr. 30, 2024

(54) INKJET RECORDING DEVICE AND CARTRIDGE

(71) Applicant: Keyence Corporation, Osaka (JP)

(72) Inventors: Hiroshi Miyauchi, Osaka (JP); Mamoru Idaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/110,379

(22) Filed: Feb. 16, 2023

(65) Prior Publication Data

US 2023/0191789 A1 Jun. 22, 2023

Related U.S. Application Data

(63) Continuation of application No. 17/347,654, filed on Jun. 15, 2021, now Pat. No. 11,607,887.

(30) Foreign Application Priority Data

Jul. 30, 2020 (JP) ................................. 2020-129780
Jul. 30, 2020 (JP) ................................. 2020-129781

(51) Int. Cl.
*B41J 2/175* (2006.01)
*B41J 29/13* (2006.01)

(52) U.S. Cl.
CPC ......... *B41J 2/1752* (2013.01); *B41J 2/17509* (2013.01); *B41J 2/17523* (2013.01); *B41J 2/1753* (2013.01); *B41J 2/17536* (2013.01); *B41J 2/17546* (2013.01); *B41J 29/13* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/1753; B41J 2/17536; B41J 2/17546; B41J 2/17553; B41J 2/185; B41J 29/13; B41J 2002/1853
See application file for complete search history.

(56) References Cited

U.S. PATENT DOCUMENTS 7,213,914 B2 5/2007 Anma et al.
7,300,138 B2 * 11/2007 Corner ................. B41J 2/17556 347/84
9,387,684 B2 7/2016 Ogawa et al.
9,586,425 B2 * 3/2017 MacKenzie ............ B41J 25/308
2007/0149044 A1 6/2007 Asauchi
2008/0309738 A1 * 12/2008 Yan .......................... B41J 2/175 347/85
2018/0001650 A1 1/2018 Miyashita et al.
2018/0250943 A1 9/2018 Fukasawa et al.
2022/0032628 A1 2/2022 Miyauchi et al.

FOREIGN PATENT DOCUMENTS

JP 2015134431 A 7/2015

* cited by examiner

*Primary Examiner* — Anh T Vo
(74) *Attorney, Agent, or Firm* — Kilyk & Bowersox, P.L.L.C.

(57) ABSTRACT

A ROM unit mounted to a bottle has a plurality of terminal plates on the front end surface of the ROM unit. The ROM unit is movable in a direction orthogonal to a bottle axis Ax, and can be positioned at a retreat position where an interference with a contamination preventing eaves is avoided, and a contact position projected more front than the retreat position. The terminal plates can be electrically contacted with reservoir terminals when positioning at the contact position.

19 Claims, 27 Drawing Sheets

INKJET RECORDING DEVICE AND CARTRIDGE

CROSS-REFERENCE TO RELATED APPLICATIONS

The present application is a continuation of U.S. patent application Ser. No. 17/347,654 filed Jun. 15, 2021, which in turn claims foreign priority based on Japanese Patent Application No. 2020-129780, filed on Jul. 30, 2020 and No. 2020-129781, filed on Jul. 30, 2020, the contents of which are incorporated herein by reference.

BACKGROUND OF THE INVENTION

Field of the Invention

The present invention relates to an inkjet recording device and a cartridge.

Description of the Related Art

An inkjet recording device is used for printing letters or patters on a surface of works. In Japanese Patent Application Publication No. 2015-134431, a cartridge-type inkjet recording device is described in detail. A cartridge for refilling ink or solvent is mounted on a reservoir of a device body. In the reservoir, a receiving port for receiving a mouth of the cartridge is provided, and a hollow needle is arranged in a standing manner at the central part of the receiving port. The cartridge is provided with a rubber plug for sealing the mouth. By performing a pushing down operation for mounting the cartridge by the user, the hollow needle penetrates through the rubber plug, so that the state in which the content liquid can be taken out by the hollow needle can be made. In this state, it becomes the state in which an axis of the bottle of the cartridge matches with the hollow needle. For removing the cartridge, a lifting up operation, which is opposite procedure from the pushing down operation, is performed.

The cartridge is provided with a recording medium part at the bottle neck, and the recording medium part includes a bottle side terminal.

On the other hand, in the reservoir, a terminal in the device body side is provided (hereinafter referred to as "reservoir terminal"). When mounting the cartridge, it becomes the state in which the bottle side terminal and the reservoir terminal are connected.

SUMMARY OF THE INVENTION

In the cartridge-type inkjet recording device described in Japanese Patent Application Publication No. 2015-134431, the user simply pushes down or pulls up the cartridge (bottle) along the axis of the hollow needle, and by these operations, mounting or removing the cartridge can be done. And, by performing the pushing down or pulling up operations by the user, the bottle side terminal and the reservoir terminal can be connected or disconnected. Here, the reservoir terminal is arranged in a projecting state inside the reservoir on the sidewall surface of the reservoir, and it becomes the state which can be viewed from the cartridge inserting direction, so that dust or dirt is easily adhered. In addition, ink or solvent is adhered to the reservoir terminal, so that there is possibility of getting dirty (contaminated). When the dust or dirt is adhered to the reservoir terminal, the user performs a cleaning operation such as wiping dust or dirt, etc.

In order to prevent the reservoir terminal from adhering dirt or dust as much as possible, and reduce a burden on the user to perform the cleaning operation, first, the present inventor has created to provide an eaves adjacent to the upper side of the reservoir terminal. Further, in the case of providing the eaves adjacent to the reservoir terminal, the bottle side terminal interferes with the eaves when mounting or removing the cartridge. In response to this, it is possible to request the user to operate the cartridge without interfering with the eaves when mounting or removing the cartridge. However, requesting the user's operation, it is not preferable for the users who are used to simply perform the mounting/removing operations of the cartridge because the users lose the usability of the cartridge.

An object of the present invention is to provide a cartridge and an inkjet recording device which reduce adhesion of dirt or dust onto a reservoir terminal, and has excellent usability.

In the aforementioned technical circumstances, according to one aspect of the present invention, it can be achieved by providing an inkjet recording device and a cartridge applied to the same.

The inkjet recording device includes a cartridge refilling ink or solvent to a device body of the continuous-type inkjet recording device;

a receiving port provided in the device body, mounting the cartridge, and receiving a bottle mouth of the cartridge;

a hollow needle provided in the device body, and taking out content liquid in the cartridge by inserting the hollow needle into the bottle mouth and entering an inner part of the bottle when the bottle mouth is received to the receiving port;

a recording medium part provided in the cartridge;

a first terminal provided on an end surface of the recording medium part;

a reservoir terminal provided in the device body, and contacting with the first terminal at a time of a state in which the cartridge is mounted;

a contamination preventing eaves positioned above and in a vicinity of the reservoir terminal; and an interlocking mechanism displacing the first terminal by mechanically interlocking a mounting operation in which a user mounts the cartridge, and a removing operation in which the user removes the cartridge.

The first terminal is positioned at a retreat position prevented from interfering with the contamination preventing eaves, and at a contact position contacting with the reservoir terminal by the interlocking mechanism.

According to the inkjet recording device and the cartridge of the present invention, by performing the mounting/removing operations which are the same as the conventional operations of simply pushing down or lifting up the cartridge along the bottle axis by the user, in accordance with these operations, the first terminal, that is, the bottle side terminal is mechanically interlocked and is positioned at the retreat position and the contact position. It is prevented from interfering with the contamination preventing eaves, and the first terminal, that is, the bottle side terminal and the reservoir terminal can be surely connected.

In the aforementioned technical circumstances, according to another aspect of the present invention, it can be achieved by providing a cartridge applied for the inkjet recording device provided with a contamination preventing eaves in which a reservoir receiving a bottle of the cartridge is positioned above and in a vicinity of the reservoir terminal.

The cartridge includes a recording medium part provided in the cartridge, and incorporating a recording medium; and a first terminal arranged on a front surface of the recording medium part and electrically connected with the reservoir terminal.

The first terminal is displaced in a horizontal direction orthogonal to a bottle axis, and is positioned at a retreat position where the first terminal is prevented from interfering with the contamination preventing eaves, and a contact position where the first terminal contacts with the reservoir terminal.

The aforementioned recording medium part corresponds to a ROM unit 900 included in the embodiment which will be described later. In the embodiment, the recording medium part 900 is mounted to a bottle having a bottle axis Ax. The ROM unit 900 included in the preferred embodiment is detachably provided in the bottle. With reference to FIG. 22, the ROM unit 900 is separated into two portions, and the first portion 900(1) is integrally molded with the bottle or bonded to the bottle, and the first terminal, that is, the bottle side terminal 910 including the second portion 900(2) is movable with respect to the first portion 900(1), and may be configured to enable to separate and approach with respect to the first portion 900(1). That is, the second portion 900(2) may be configured to enable to be displaced in a horizontal direction along a second axis Ax (cross) which intersects to the bottle axis Ax.

Here, the phrase "horizontal direction" related to the displacement direction of the first terminal or the bottle side terminal is most preferably the direction orthogonal to the bottle axis Ax, but it is not limited to this. The phrase "horizontal direction" is not only the direction orthogonal to the bottle axis Ax, but also the direction obliquely intersecting to the bottle axis Ax.

In order to regulate the displacement direction of the second portion 900(2), a guiding mechanism provided with substantially the same function as a displacement guiding mechanism SL which will be described in the preferable embodiment may be incorporated in the first and second portions 900(1), 900(2). The recording medium incorporated in the recording medium part 900 may be incorporated in the first portion 900(1), and may be incorporated in the second portion 900(2).

By employing a cam mechanism which will be described in the preferred embodiment, the displacement of the second portion 900(2) can be mechanically interlocked with the mounting operation in which the user mounts the cartridge and the removing operation in which the user removes the cartridge.

An effect and other objects of the present invention become apparent from the detailed descriptions of the preferred embodiments of the present invention below.

DETAILED DESCRIPTION

Hereinafter, the embodiments of the present invention will be described with reference to the drawings.

<Automatic Printing System and Inkjet Printer>

Figure 1:
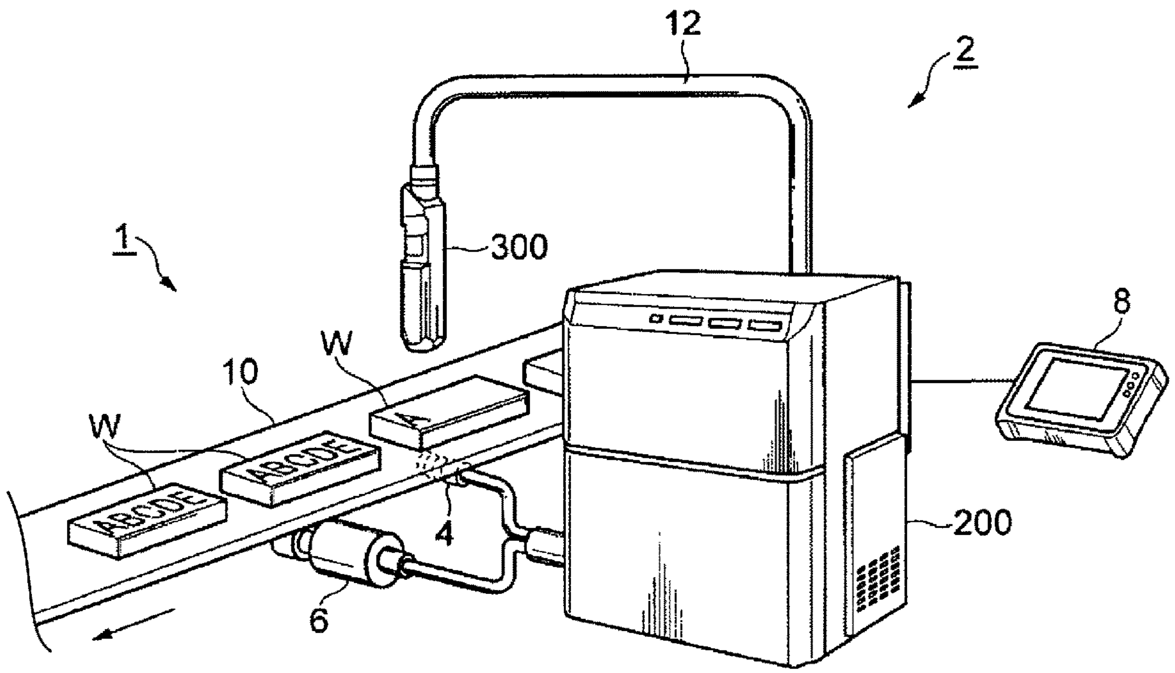
FIG. 1 is an entire constitution diagram of an automatic printing system including a cartridge-type inkjet printer of an embodiment.

FIG. 1 is a schematic diagram showing an example of an automatic printing system including an inkjet recording device. The shown automatic printing system 1 is provided with an inkjet recording device 2 of the embodiment, a work detection sensor 4, a conveyance speed sensor 6, and a display device 8, etc.

In general, the inkjet recording device 2 is called as "inkjet printer". The inkjet printer 2 is the continuous-type printer which continuously ejects ink. The inkjet printer 2 prints letters or patterns to works W which are placed on a work conveyance line 10 and conveyed on the work conveyance line 10. The works W as a printing object are, for example, an electronic component, a plastic bag, etc. A work detection sensor 4 outputs a trigger to start printing by detecting presence/absence of the works W. By receiving the trigger signal, the inkjet printer 2 starts printing.

The inkjet printer 2 has a printer body 200 and a head 300, and the printer body 2 and the head 300 are connected by a flexible hose 12. The quick-drying ink liquid is circulated between the printer body 200 and the head 300, and the printing is executed by the head 300.

Figure 2:
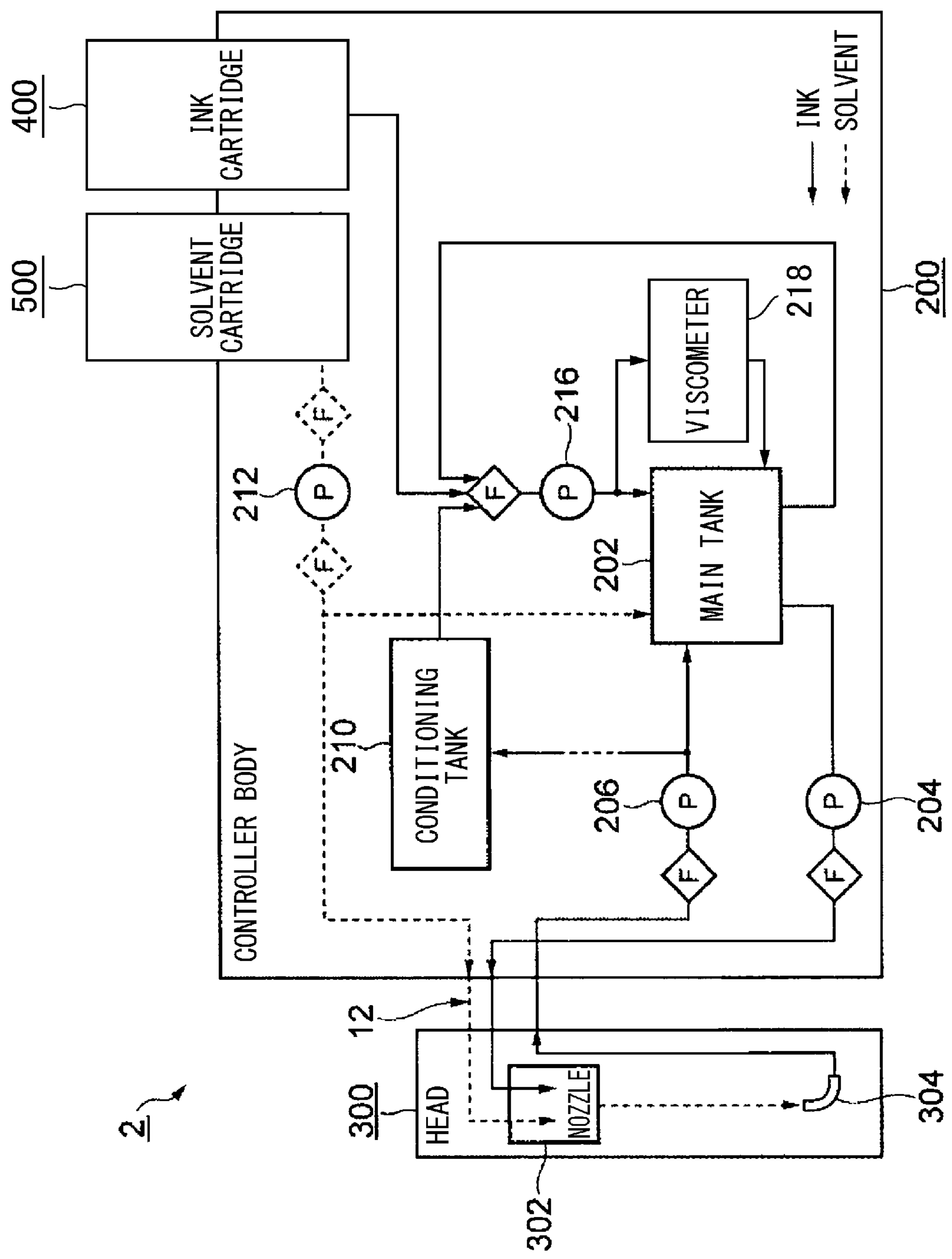
FIG. 2 is an entire constitution diagram of a printer body which is a main element of the inkjet printer.

FIG. 2 is a schematic block diagram showing the entire constitution of the inkjet printer 2. The printer body 200 has a main tank 202 inside the printer body, and the quick-drying ink liquid is stored in the main tank 202. The ink liquid inside the main tank 202 is supplied to a nozzle 302 of the head 300 by the first pump (ink supply pump) 204. The supply of the ink liquid to the nozzle 302 always continues, and among the ink droplet discharged from the nozzle 302, the ink droplet which is not used for printing the works W is received by a gutter 304. The ink droplet dropped to the gutter 304 is sucked by the gutter pump 206, and collected to the main tank 202. In the drawing, reference numeral "F" indicates a filter.

In the inkjet printer 2, refilling the ink and the solvent is a cartridge-type. In the printer body 200, the ink cartridge 400 and the solvent cartridge 500 are detachably mounted. In the ink cartridge 400, ink liquid to be refilled to the main tank 202 is stored. In the solvent cartridge 500, a solvent keeping the viscosity of the ink liquid constant, for example, methyl ethyl ketone (MEK) is stored.

In the inkjet printer 2, at the time of the start or the stop of the ink circulation system, the cleaning processing to clean inside the nozzle 302 of the head 300 is performed. At the time of cleaning the nozzle 302, the solvent inside the solvent cartridge 500 is supplied to the nozzle 302 of the head 300 directly by the solvent pump 212. And, the solvent discharged from the nozzle 302 is received in the gutter 304. The solvent received by the gutter 304 is sucked by the gutter pump 206 and is fed to the conditioning tank 210. The solvent inside the conditioning tank 210 is supplied to the main tank 202 by the replenishing/circulation pump 216 if necessary, and with this, the collected solvent is reused.

The replenishing/circulation pump 216 also has functions to deliver ink liquid for refill, which is stored inside the ink cartridge 400, to the main tank 202 if necessary and circulate the ink inside the main tank 202, and the ink liquid is always circulated inside the main tank 202 by the replenishing/circulation pump 216. A viscometer 218 is provided in the main tank 202, and the viscosity of the ink liquid inside the main tank 202 is detected by the viscometer 218, and according to the viscosity detected by the viscometer 218, by supplying the solvent from the conditioning tank 210 to the main tank 202, the viscosity of the ink liquid inside the main tank 202 is kept constant.

<Ink Cartridge, Solvent Cartridge>

Figure 3:
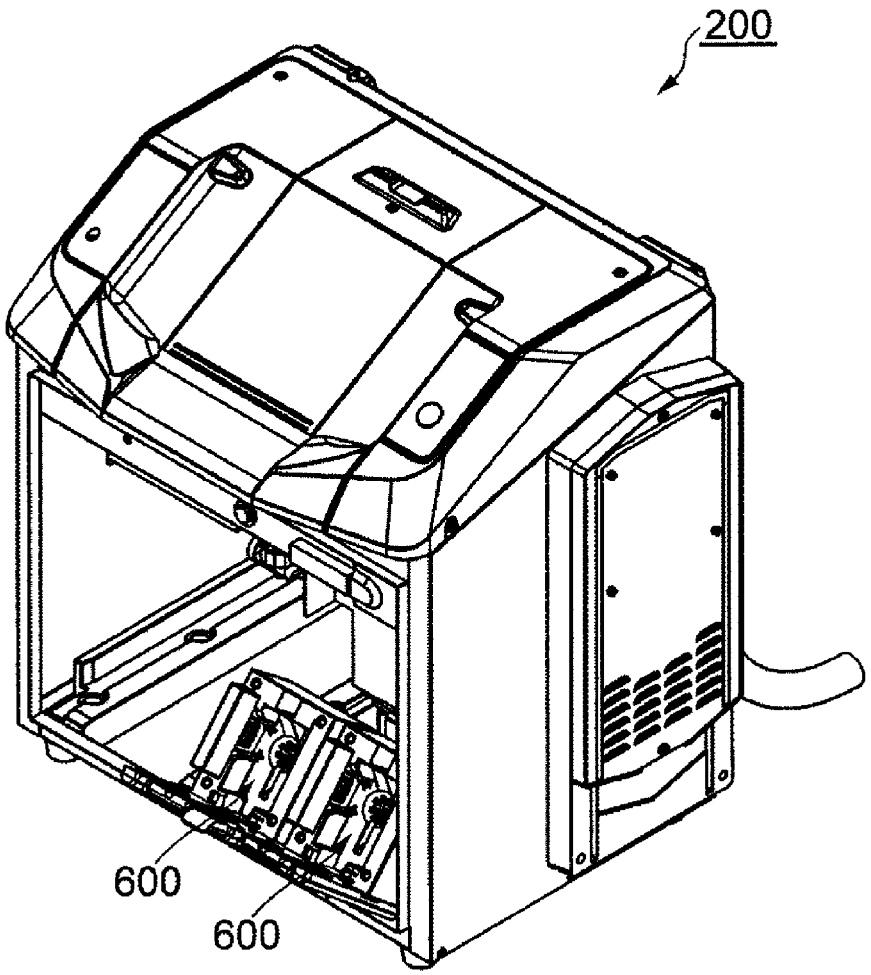
FIG. 3 is a diagram showing the printer body in a state in which the front door is removed, and describing the state in which each of reservoirs is empty before mounting the ink cartridge and the solvent cartridge.
Figure 4:
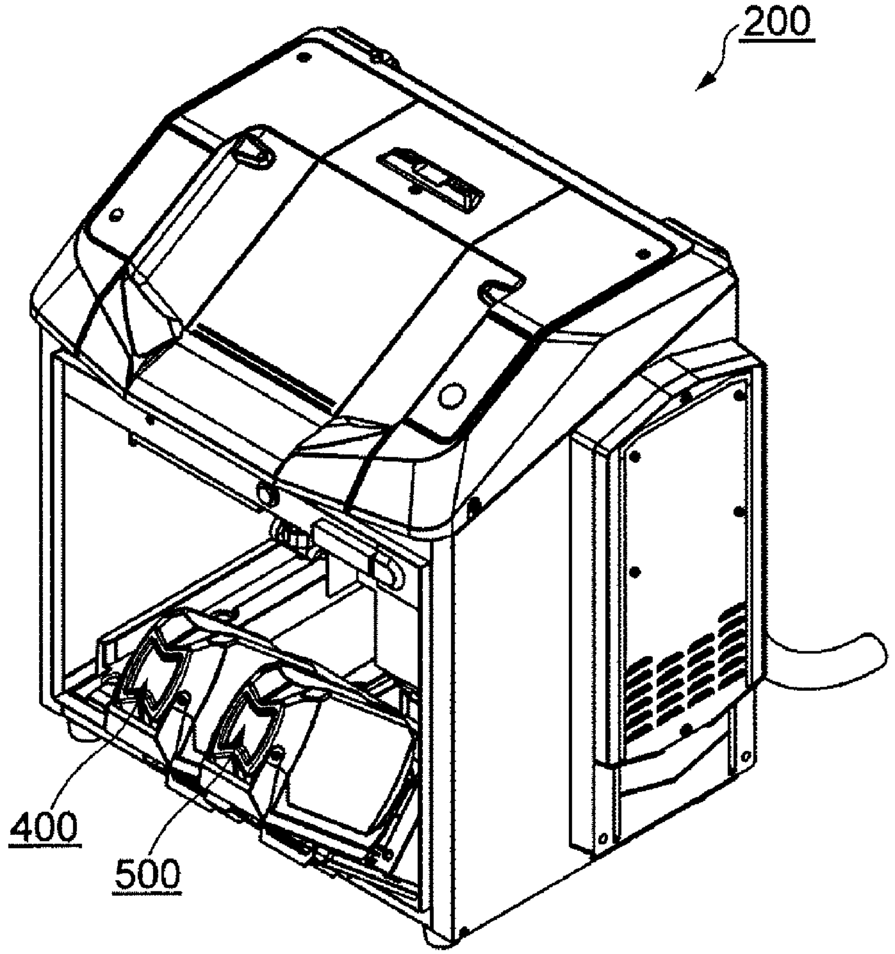
FIG. 4 is a diagram showing the printer body in the state in which the front door is removed, and describing the state in which the ink cartridge and the solvent cartridge are inserted into the reservoirs, respectively.
Figure 5:
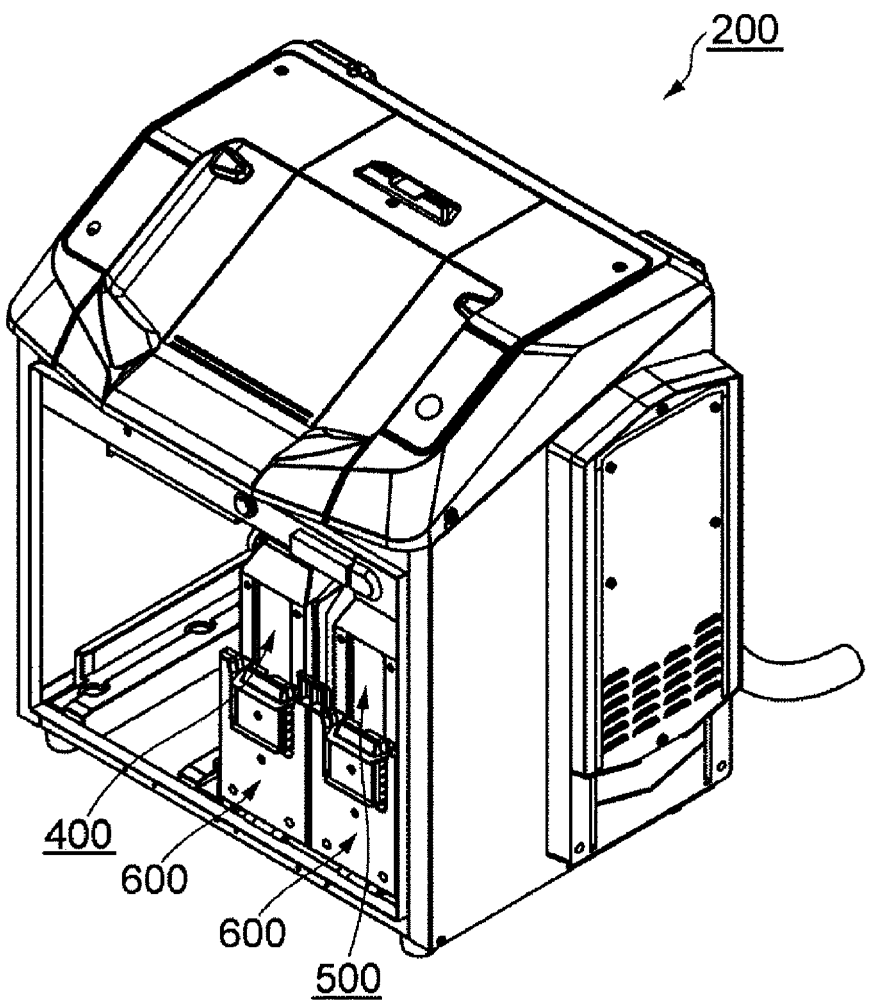
FIG. 5 is a diagram showing the printer body in the state in which the front door is removed, and describing a completed state of mounting the ink cartridge and the solvent cartridge into the reservoirs, respectively.

FIGS. 3 to 5 show the printer body 200 in a state in which the front door is removed. FIG. 3 shows a state in which the ink cartridge 400 and the solvent cartridge 500 are removed. With reference to FIG. 3, the printer body 200 has two reservoirs 600 for receiving the ink cartridge 400 and the solvent cartridge 500, and the reservoirs 600 have substantially the same structure for the ink cartridge 400 and for the solvent cartridge 500. The reservoirs 600 are provided in a swingable manner. By swinging the reservoirs 600 around the horizontal axis, the ink cartridge 400 and the solvent cartridge 500 can take two postures as the first posture, a standing state in a vertical direction (see FIG. 5), and as the second posture, an inclined state which is the posture inclined outside the printer body 200 in a predetermined angle from the vertical direction (see FIG. 4).

FIG. 4 shows the state when the ink cartridge 400 and the solvent cartridge 500 are mounted or removed. As shown in FIG. 4, by inclining the ink cartridge 400 and the solvent cartridge 500 outside the printer body 200 in a predetermined angle, the mounting/removing operations of the ink cartridge 400 and the solvent cartridge 500 can be easily performed. FIG. 5 shows the ink cartridge 400 and the solvent cartridge 500 in the use state. In the use state, the ink cartridge 400 and the solvent cartridge 500 are stored in the printer body 200 in the standing state in the vertical direction.

<Bottle>

Figure 6:
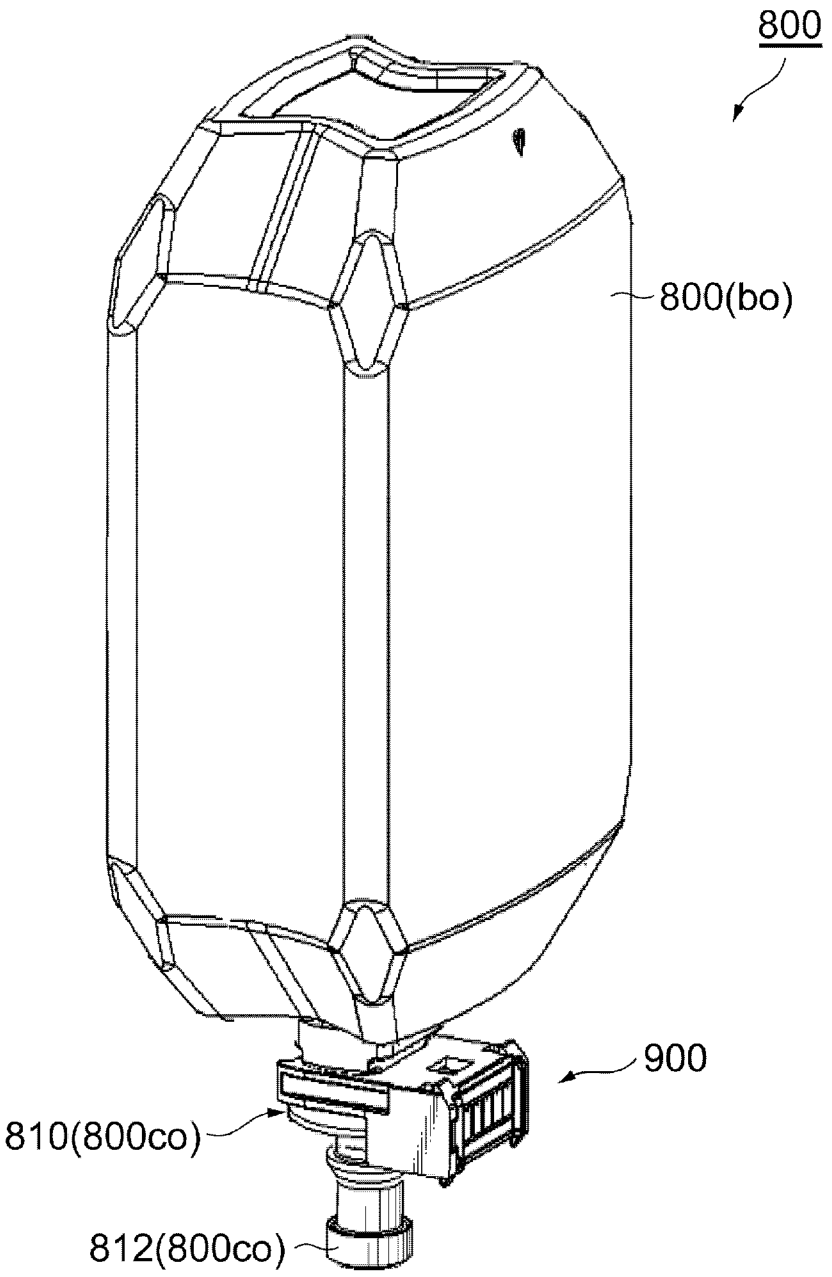
FIG. 6 is a diagram describing a shape of a bottle of the cartridge.
Figure 7:
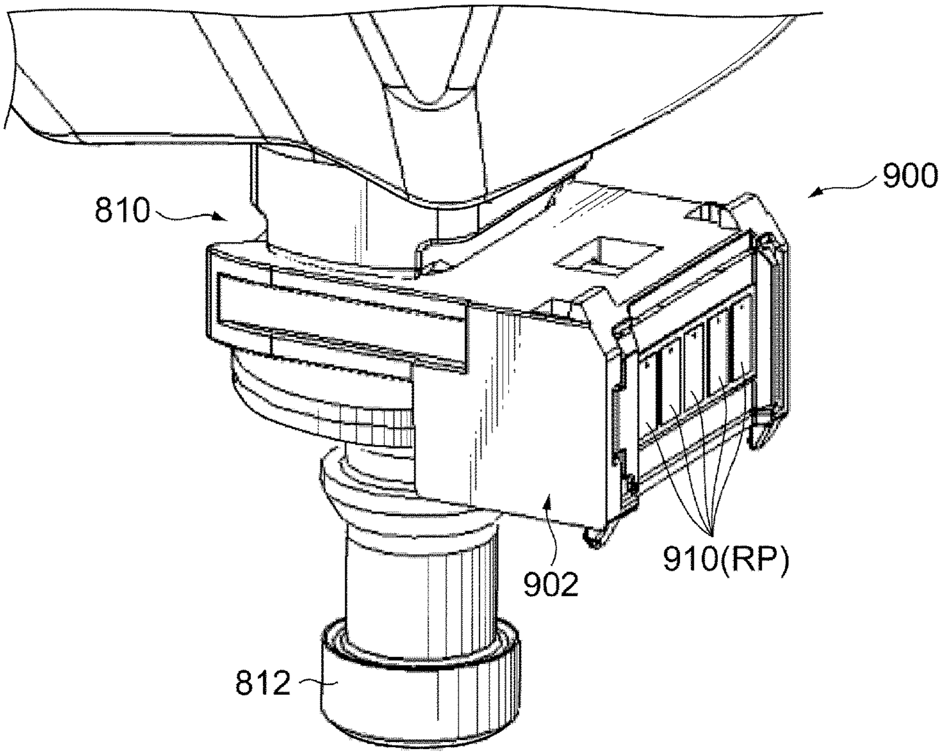
FIG. 7 is a diagram describing a ROM unit attached to the neck part and the mouth of the bottle, and attached to a neck part, and a terminal plate of the ROM unit is positioned at the retreat position.
Figure 8:
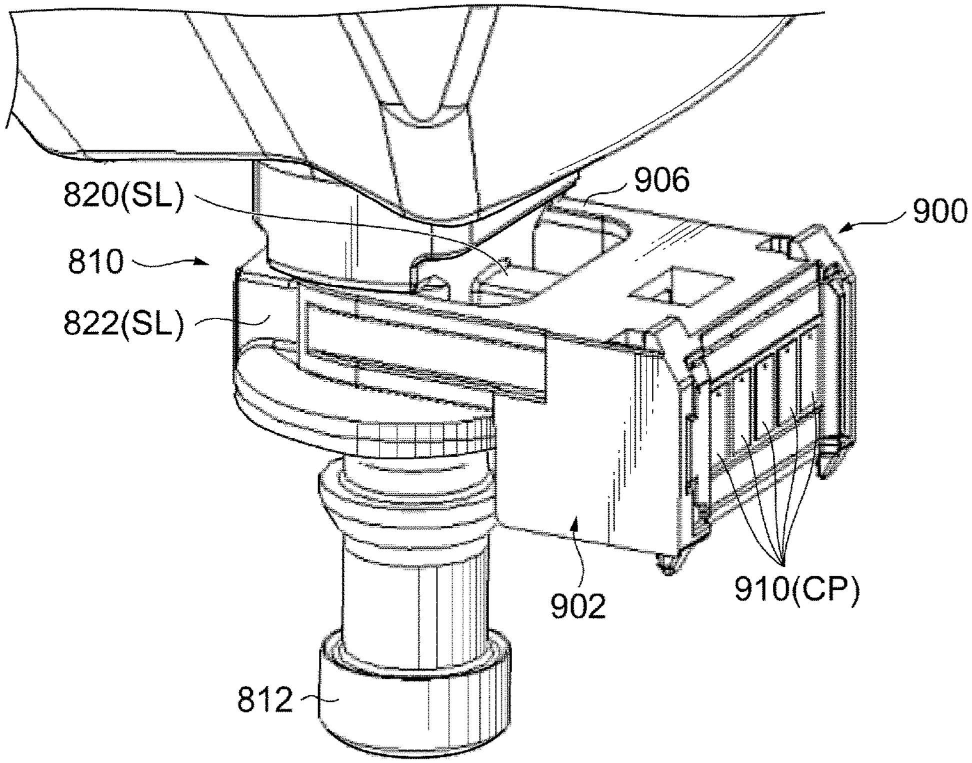
FIG. 8 is a diagram describing a ROM unit attached to the neck part and the mouth of the bottle, and attached to a neck part, and a terminal plate of the ROM unit is positioned at the contact position.
Figure 9:
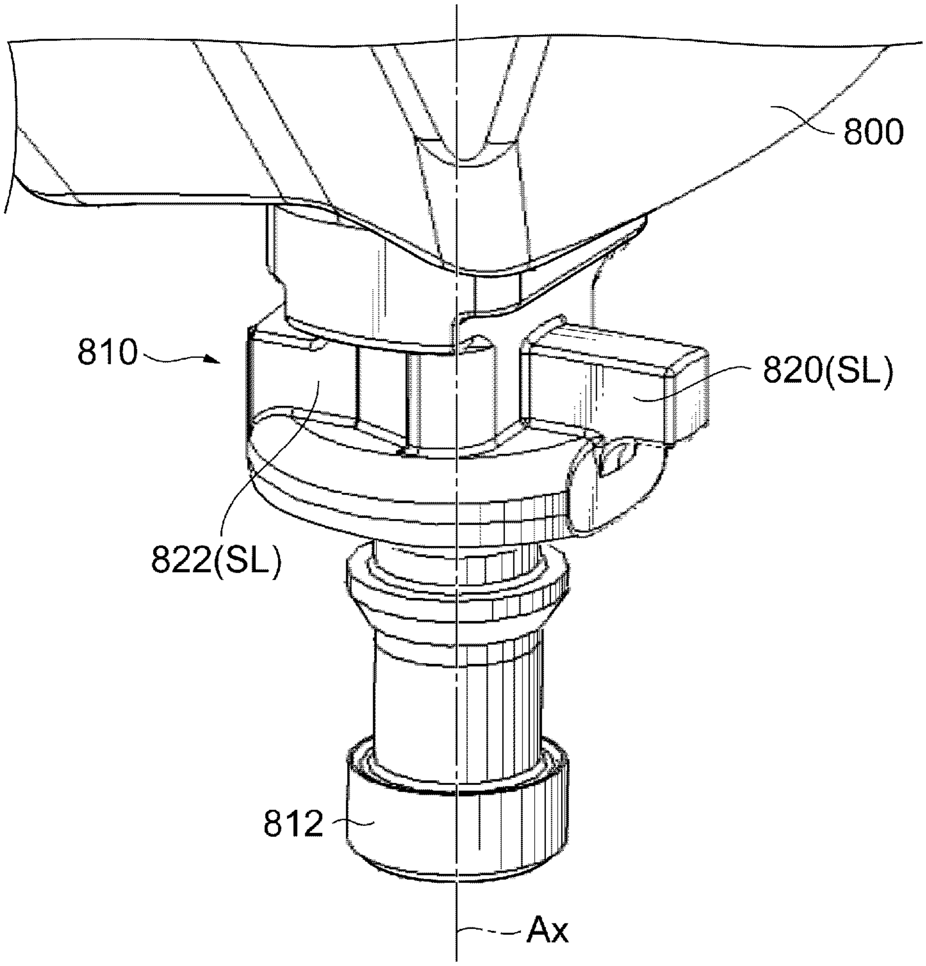
FIG. 9 is a diagram describing the structure of the neck part and the mouth of the bottle.

FIG. 6 shows a bottle 800, and FIGS. 7 to 9 are an enlarged diagram showing a neck part 810, a mouth 812 of the bottle 800. The bottle 800 is a plastic molded product, and it is commonly applied to the ink cartridge 400 and the solvent cartridge 500. In the bottle neck 810, a recording medium part having a recording medium is provided. Specifically, the recording medium part is configured with a ROM unit 900, and the ROM unit 900 is mounted to the bottle neck 810. FIG. 9 is a diagram showing the state before mounting the ROM unit 900. In the mouth 812, after filling the content liquid (ink or solvent) to the bottle 800, a rubber plug (see reference numeral 812*a* in FIG. 17) is fitted so as to seal the bottle 800.

Well understood from FIG. 9, the bottle 800 has a guide rod 820 extending in the horizontal direction in the neck part 810, and the guide rod 820 is integrally molded with the bottle 800. Specifically, the guide rod 820 extends in a direction orthogonal to the longitudinal axis (bottle axis) of the bottle 800, and in a direction separating from the neck part 810. Further, in the neck part 810, a guide groove 822 is provided at the right and left side surfaces (not shown the opposite side guide groove for reasons of illustrating the drawing), and the pair of the right and left guide grooves 822 extends in a direction orthogonal to the bottle axis Ax.

Note that the bottle 800 is one example of the body part having an internal space for storing ink and solvent. Further, the neck part 810 and the mouth 812 extend in a direction of the bottle axis Ax from the bottle 800, and have a passage connecting with the internal space of the bottle 800, and it is one example of a pipeline part. This point is supplementally described with reference to FIG. 6. The bottle 800 has a bottle body 800*bo* provided with the internal space for storing ink or the solvent, and a pipeline part 800*co* provided at one end side of the bottle body in the longitudinal direction, and the pipeline part 800*co* extends in the first direction from the bottle body 800*bo*. The pipeline part 800*co* is configured with the aforementioned mouth 812, and further, the base end part of the mouth 812 is configured with the neck part 810. The ink or the solvent inside the bottle body 800*bo* can flow out through the pipeline configured with the pipeline part 800*co*. The extending direction of the pipeline part 800*co*, that is the first direction, is regulated by the central axis of the bottle 800, and the bottle axis Ax is substantially constituted.

<ROM Unit>

Figure 10:
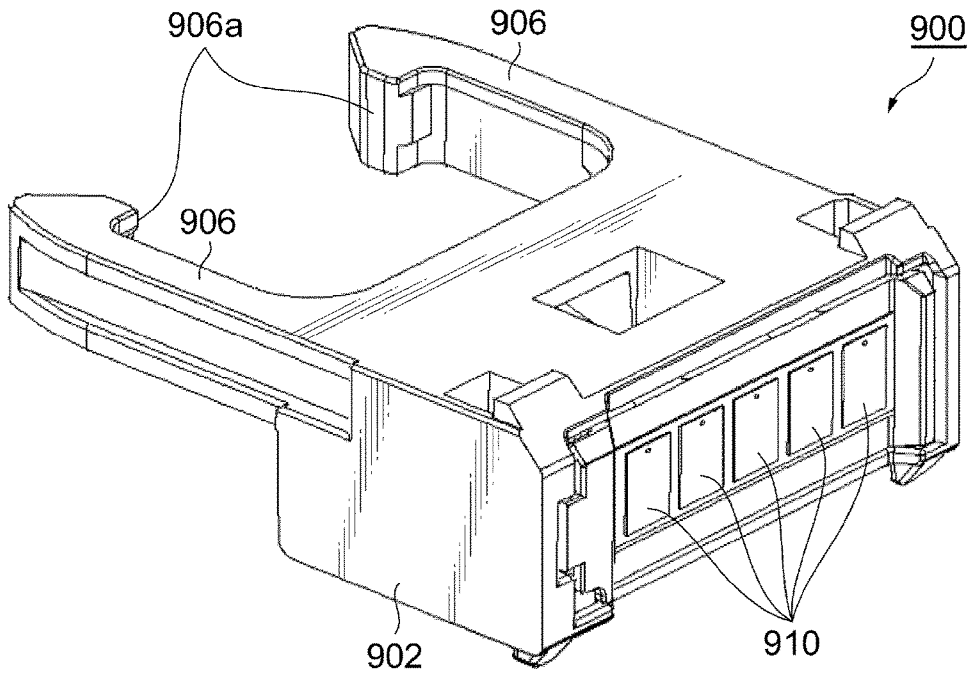
FIG. 10 is a perspective view showing the ROM unit when viewed obliquely from the upper side.
Figure 11:
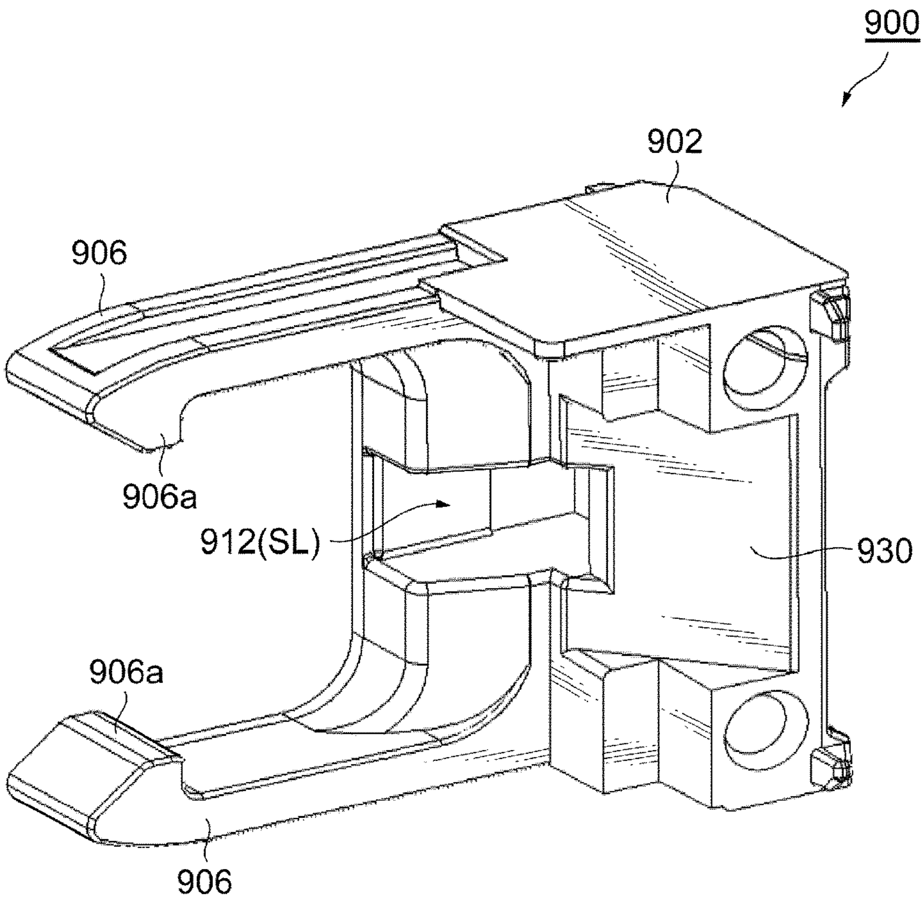
FIG. 11 is a perspective view showing the ROM unit when viewed obliquely from the lower side.

FIGS. 10 and 11 show a ROM unit 900 configuring a recording medium part. FIG. 10 is a perspective view showing the ROM unit 900 when viewed obliquely from the upper side, and FIG. 11 is a diagram showing the ROM unit 900 when viewed obliquely from the lower side. The ROM unit 900 is provided with a unit body 902 in which the recording medium is installed, and a pair of arm parts 906, and the pair of arm parts 906 and the unit body 902 are integrally molded.

The ROM unit 900 is detachably and slidably installed in the horizontal direction to the bottle neck 810 in a state in which the pair of arm parts 906 are received to the aforementioned guide grooves 822 (FIGS. 7 and 8). In detailed description, the top end part of the pair of arm parts 906 has a slip-off preventing projection 906*a* (FIGS. 10 and 11), and the slip-off preventing projections 906*a* prevent the ROM unit 900 from falling off from the bottle neck 810.

Figure 12A:
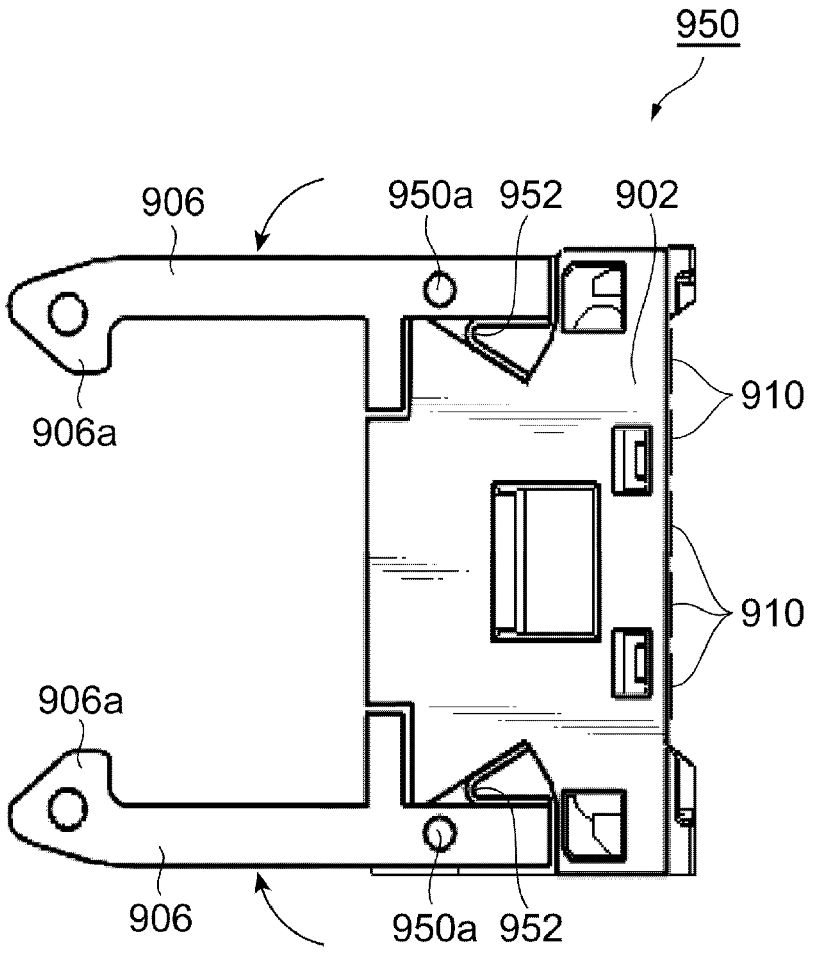
FIG. 12A is a diagram showing a modified example of the ROM unit when viewed from the upper side, and a pair of arm parts are positioned at the closing position.
Figure 12B:
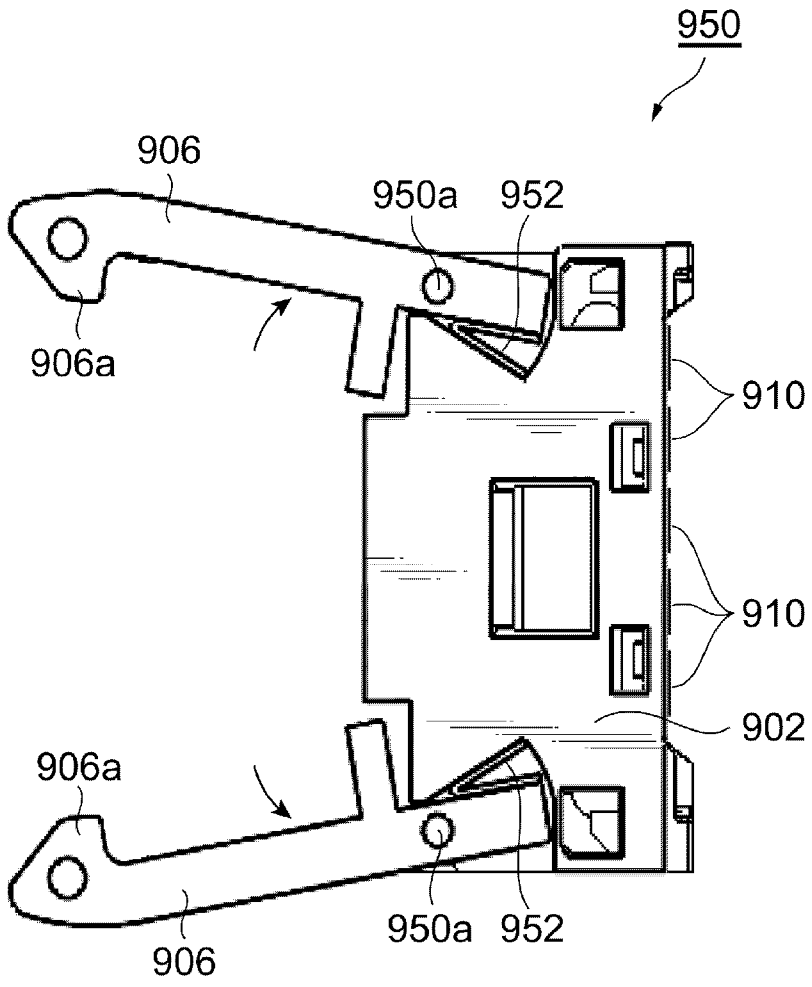
FIG. 12B is a diagram showing the modified example of the ROM unit when viewed from the upper side, and a pair of arm parts are positioned at the open position.

As the modified example of the ROM unit 900, the pair of arm parts 906 may be swingable. In FIGS. 12A and 12B, in the modified example of the ROM unit 950, each of the arm parts 906 is swingable around the vertical axis 950*a*, and each arm part 906 is energized in a closing direction by a spring 952. FIG. 12A shows a pair of arm parts 906 in the closing position. By taking the pair of arm parts 906 in the closing position by the energizing force of the spring, it becomes a state in which the ROM unit 950 is locked in the bottle neck 810. FIG. 12B shows the open position of the pair of arm parts 906. By positioning the pair of arm parts 906 in the open position against the energizing force of the spring operated by the user, the ROM unit 950 can be removed from the bottle neck 810.

EEPROM (Electrically Erasable Programmable Read-Only Memory) which is a nonvolatile memory as a recording medium is built into a unit body 902 of the ROM unit 900. In the EEPROM, other than the information such as a lot number unique to a cartridge, a maker identification number, a cartridge version, a manufacturer identification number, a type of ink or solvent, a serial number, (ink or cartridge) date of manufacture, etc., remaining amount of ink or solvent in the bottle 800 is recorded. Further, in the EEPROM, preferably, an identification number (or serial number) unique to the ink cartridge 400 or the solvent cartridge 500 mounted to the ROM unit 900 is recorded, and the remaining amount of the ink or the solvent of the ink cartridge 400 or the solvent cartridge 500 may be managed in the printer body 200 side based on the identification number.

In the unit body 902, a plurality of longitudinal terminal plates (bottle side terminal) 910 is arranged in a side-by-side manner on the end surface of the unit body (FIG. 10). With reference to FIG. 11, in the unit body 902, a recess 912 extending in a direction orthogonal to the bottle axis Ax is formed, and the aforementioned guide rod 820 (FIG. 9) is slidably received into the recess 912. Note that the bottle side terminal 910 is one example of the terminal which is accessed from the printer body 200 of the inkjet printer 2.

As described above, the ROM unit 900 and the bottle neck 810 have two displacement guiding mechanisms SL. The first one is configured with the guide rod 820 in the bottle side and the recess 912 in the ROM unit side. The second one is configured with the pair of arm parts 906 and the guide groove 822 which receives the pair of arm parts. By these two displacement guiding mechanisms SL, the ROM unit 900 is movable in the horizontal direction, and with this, the terminal plate 910 can be positioned at the contact position (FIG. 8) which is the position relatively outside, and at the retreat position (FIG. 7) which is the position relatively inside. That is, the terminal plate 910 can be moved in parallel between the retreat position RP (FIG. 7) in which the terminal plate can avoid interfering with a contamination preventing eaves 620 by moving close to the bottle axis Ax, and the contact position CP (FIG. 8) in which the terminal plate is positioned relatively away from the bottle axis Ax. At the contact position, the terminal plate 910 can be electrically connected with the reservoir terminal 602. Note that the pair of arm parts 906 and/or the slip-off preventing projections 906*a*, etc. configure a guide part for guiding the displacement of the terminal plate 910 in a predetermined regulated direction (direction orthogonal to the bottle axis Ax in the first embodiment).

As described above, the bottle 800 configuring the main part of the cartridge includes the ROM unit 900, and in the preferable embodiment, the terminal plate 910 can be displaced between the retreat position RP (FIG. 7) and the contact position CP (FIG. 8). The bottle 800 includes the mechanism guiding the displacement of the terminal plate 910. This mechanism is configured with the aforementioned guide part.

<Reservoir>

Figure 13:
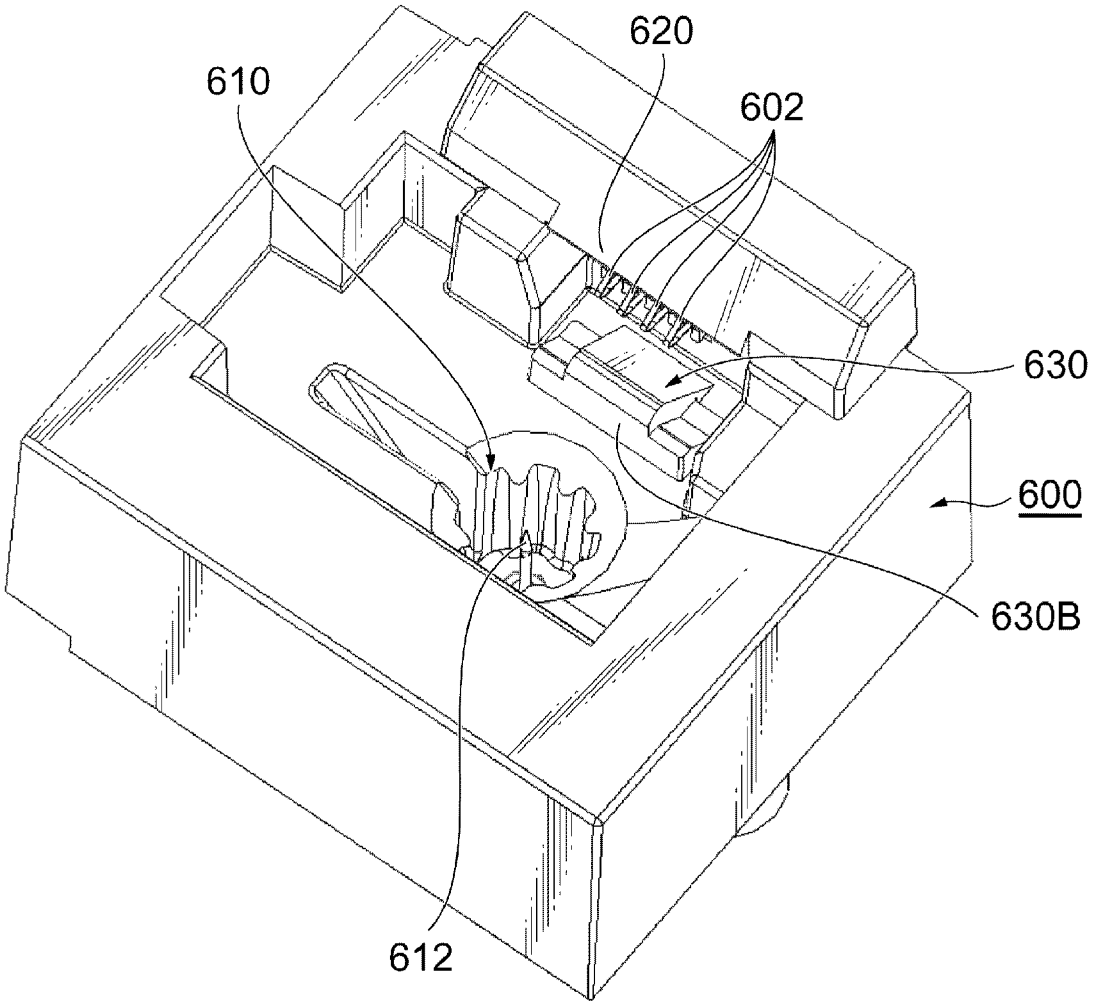
FIG. 13 is a perspective view showing the reservoir when viewed obliquely from the upper side.
Figure 14:
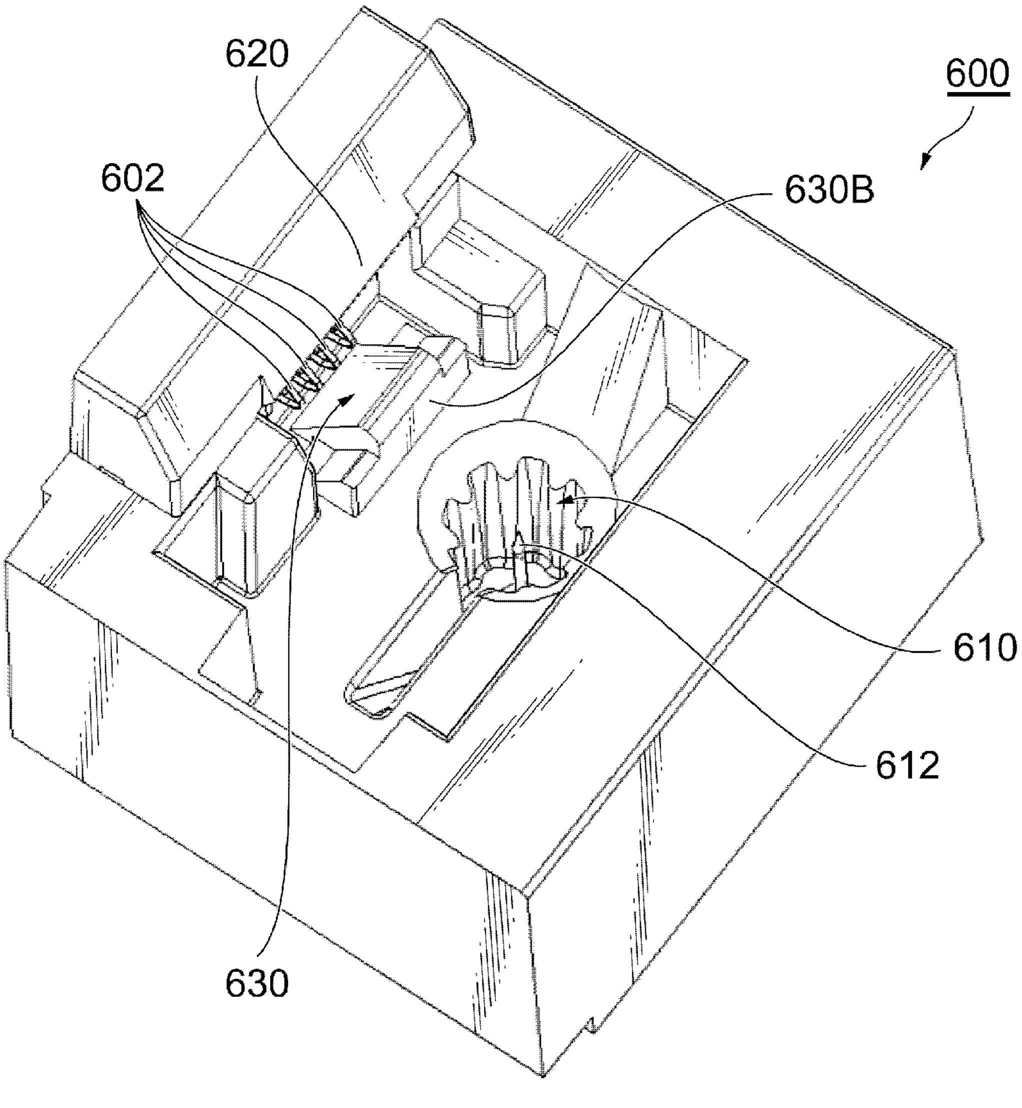
FIG. 14 is a perspective view showing a reservoir in a position different from FIG. 13 when viewed obliquely from the upper side.

FIGS. 13 and 14 show a reservoir 600 which receives the mouth 812 of the bottle 800. The reservoir 600 has rectangular shaped walls in a plan view, and in one of its walls, a plurality of reservoir terminal s 602 is formed by bending the metal rod having spring property. Each reservoir terminal 602 is arranged in a position corresponding to each terminal plate 910 of the ROM unit 900.

Reference numeral 610 shown in FIGS. 13 and 14 indicates a receiving port which opens upwardly, and the bottle mouth 812 (FIG. 7) is inserted into the receiving port 610. The hollow needle 612 is arranged at the central part of the bottom part of the receiving port 610. The hollow needle 612 stands on the same axis as the axis Ax of the bottle. By mounting and pushing down the ink cartridge 400 and the solvent cartridge 500 to the reservoirs 600, the hollow needle 612 penetrates the rubber plug of the bottle mouth 812 (see reference numeral 812*a* in FIG. 17). In this state, the hollow needle 612 is positioned in the same axis of the bottle axis Ax, and the content liquid of the ink cartridge 400 and the solvent cartridge 500 can be taken out through the hollow needle 612. Note that the receiving port 610 has a function configuring a part of the cartridge receiving part in which the ink cartridge 400 and the solvent cartridge 500 are inserted.

The reservoir 600 has a contamination preventing eaves 620 above and near the reservoir terminal 602, and the contamination preventing eaves 620 is more projected than the reservoir terminal 602, so as to prevent the reservoir terminal 602 from being contaminated by the ink or the solvent.

Figure 15A:
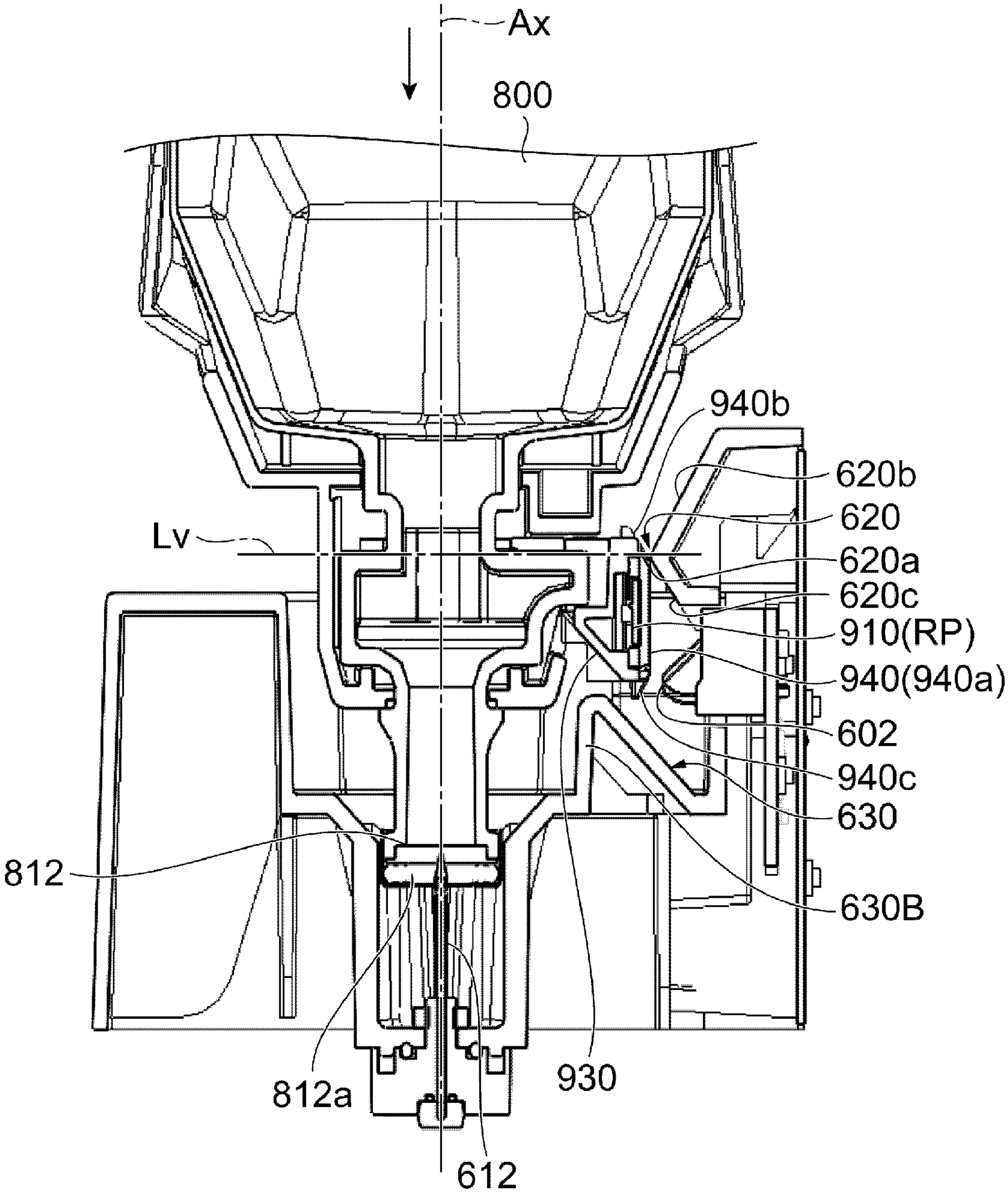
FIG. 15A is a diagram showing the state in which the upper end of the terminal plate of the ROM unit is positioned approximately at a height level Lv of an eaves peak of a contamination preventing eaves in the process of the lowering operation of the bottle.
Figure 15B:
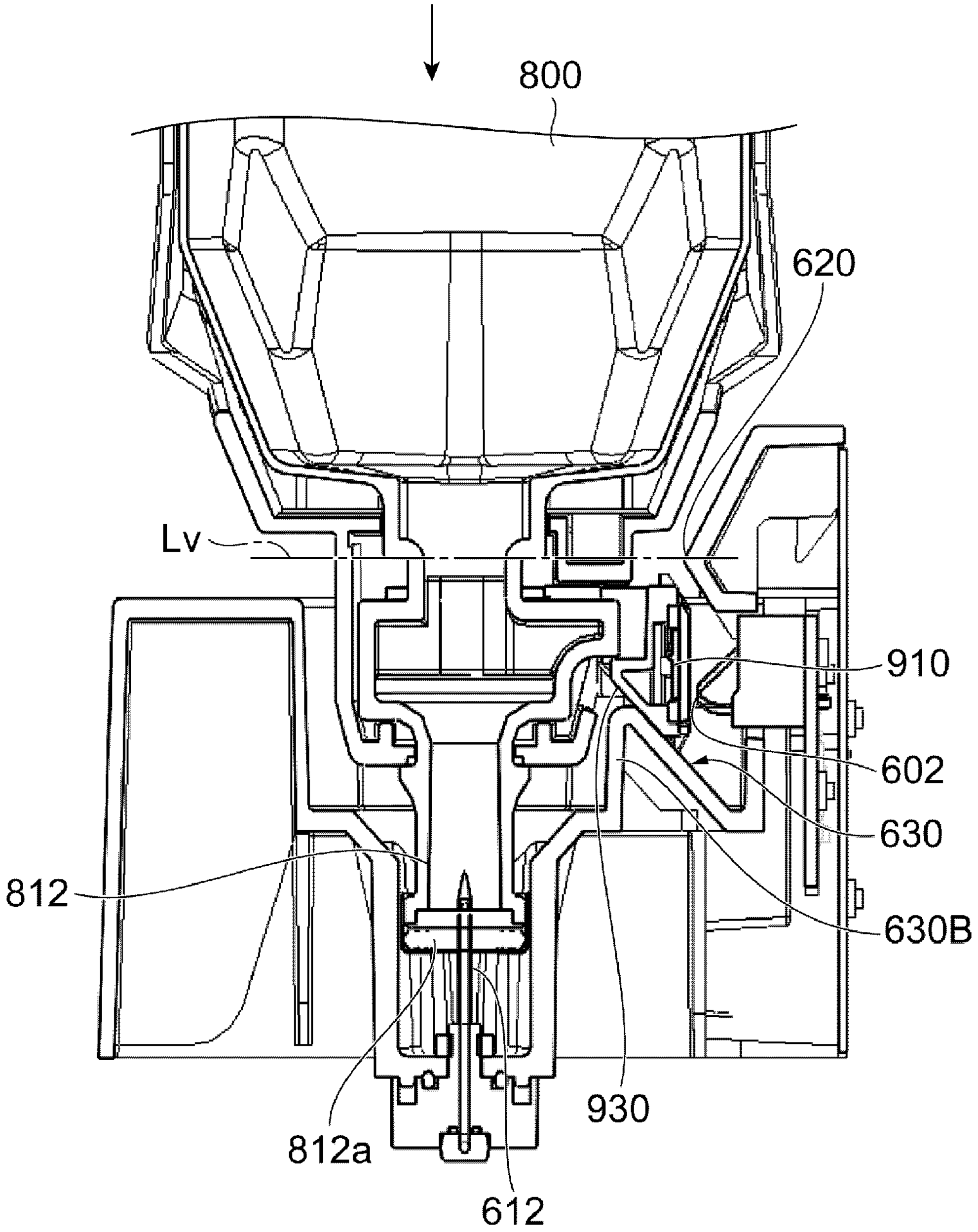
FIG. 15B is a diagram showing the state in which the bottle shown in FIG. 15A is further lowered.
Figure 15C:
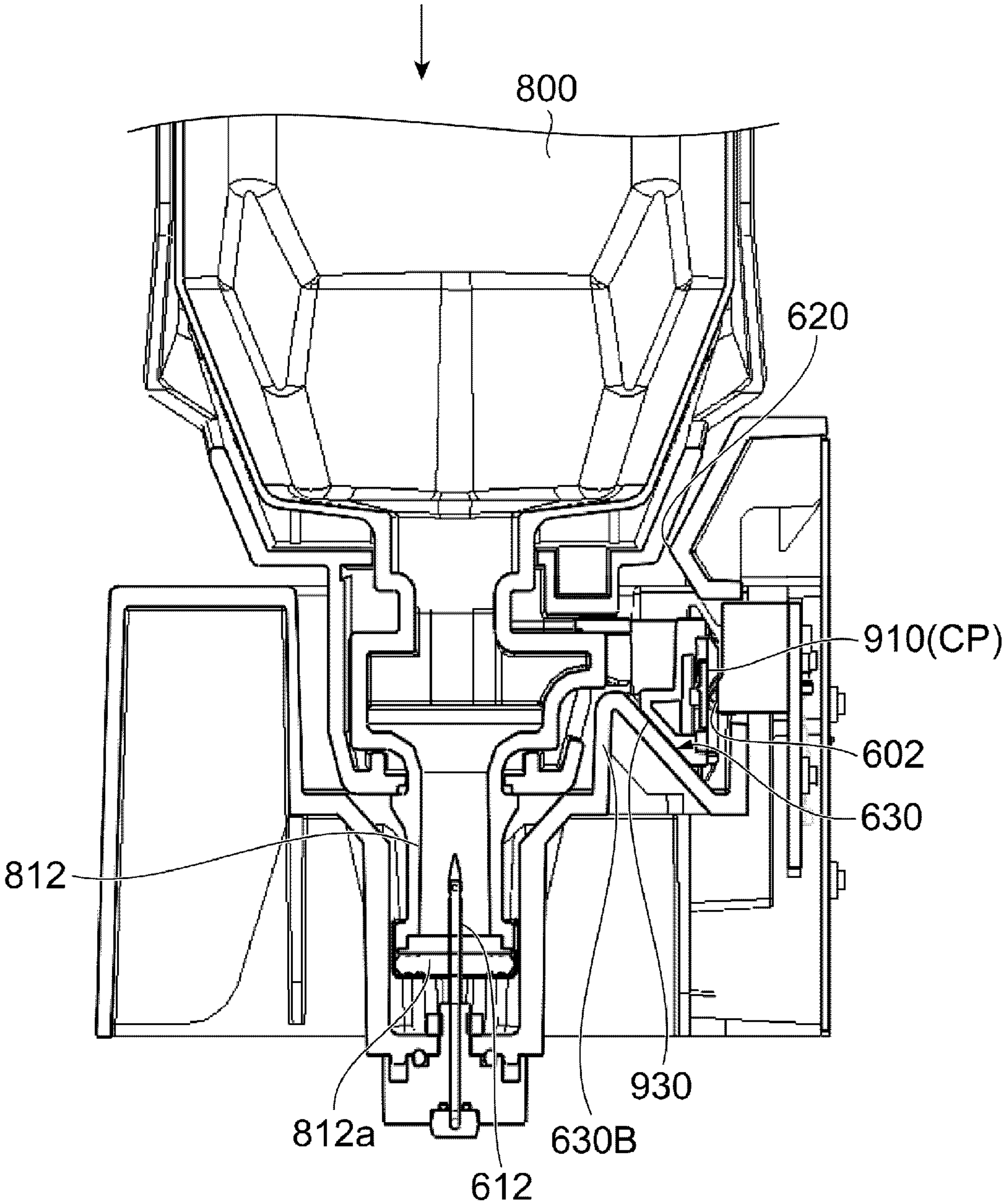
FIG. 15C is a diagram showing the state in which the bottle shown in FIG. 15B is further lowered and the terminal plate of the ROM unit is positioned at the contact position.

FIGS. 15A to 15C are diagrams describing a state in which the terminal plate 910 is positioned at the retreat position RP and the contact position CP by displacing the ROM unit 900 in the horizontal direction while mechanically interlocking with the mounting and removing operations of the ink cartridge 400 and the solvent cartridge 500 to and from the reservoir 600.

As described above, the reservoir 600 has the contamination preventing eaves 620 positioned above the reservoir terminal 602. The movement of the bottle 800 when the ink cartridge 400 or the solvent cartridge 500 is mounted to the reservoir 600 is the movement from upside to downside. And, this downward movement of the bottle 800 is the movement along the bottle axis Ax, and the bottle axis Ax is the same axis as the axis of the hollow needle 612.

Figure 16:
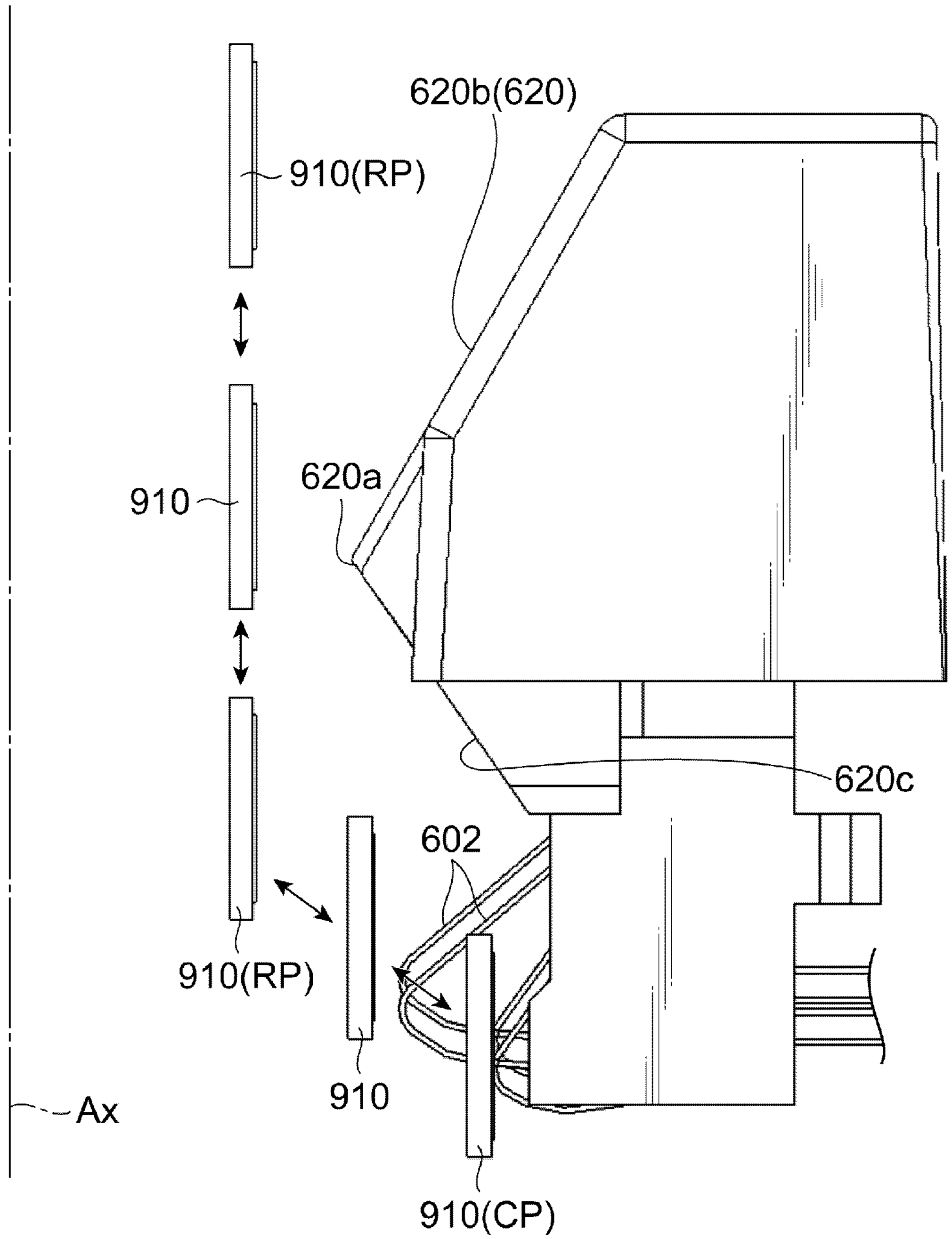
FIG. 16 is a diagram describing the state in which the terminal plate is displaced between the retreat position and the contact position by interlocking with the mounting or removing operation of the cartridge.

FIG. 16 shows a moving locus of the terminal plate 910 by interlocking with the pushing down operation or the lifting up operation of the bottle 800. In the process of the pushing down operation of the bottle 800, in the step when interfering the terminal plate 910 of the ROM unit 900 with the contamination preventing eaves 620, the terminal plate 910 is positioned at the position not interfering with the contamination preventing eaves 520, that is, the retreat position RP. At the point where the position of the terminal plate 910 becomes lower than the contamination preventing eaves 620, the terminal plate 910 is forwarded and displaced to the contact position CP so as to be able to contact with the reservoir terminal 602. These series of the displacement of the terminal plate 910 are performed by mechanically interlocking with the pushing down operation of the bottle 800.

That is, in accordance with the pushing down operation of the bottle 800, the terminal plate 910 is lowered along the bottle axis A while positioning at the retreat position RP in the step of passing through the contamination preventing eaves 620. The terminal plate 910 positioned at the retreat position RP does not interfere with the contamination preventing eaves 620 of the printer body 200 side. When the terminal plate 910 is moved lower than the contamination preventing eaves 620, the terminal plate 910 starts projecting toward the front side while moving lower. And, after the hollow needle 612 penetrates the mouth 812, the terminal plate 910 is positioned at the contact position CP, and becomes an electrically contacting state with the reservoir terminal 602 of the printer body 200 side.

<Displacement Guiding Mechanism SL Included in Interlocking Mechanism 700>

As described above, the ROM unit 900 is movable in the horizontal direction. That is, the ROM unit 900 is movable in the direction orthogonal to the bottle axis by the displacement guiding mechanism SL, and with this, the terminal plate 910 can be displaced between the contact position CP (FIG. 8) where the terminal plate is positioned relatively outward and contacts with the reservoir terminal 602, and the retreat position RP (FIG. 7) where the terminal plate 910 is positioned relatively inward.

<Inclined Cam Surface 630 of Reservoir 600>

With reference to FIGS. 13 and 14, the reservoir 600 has an inclined body side cam surface 630 in the bottom part of the reservoir. The body side inclined cam surface 630 is fixed to the printer body 200 via the reservoir 600. The body side inclined cam surface 630 is positioned in the lower side of the reservoir terminal 602.

The body side inclined cam surface 630 is positioned in the front side of the reservoir terminal 602, and the lower-side block 630B including the body side inclined cam surface 630 configures the contamination preventing wall which prevents the reservoir terminal 602 from the contamination.

The body side inclined cam surface 630 is configured with the surface directed upward, and the end close to the hollow needle 612 is positioned relatively higher, and the end away from the hollow needle 612, that is, the bottle axis Ax is positioned lower. That is, the body side inclined cam surface 630 is configured with the inclined surface which is inclined lowering the front from the end close to the bottle axis and the end away from the bottle axis when viewed in a plan view. The body side inclined cam surface 630 configures “driving cam part” in the relationship with the inclined cam follower surface 930 of the ROM unit which will be described next.

<Inclined Cam Follower Surface 930 of ROM Unit 900>

Well understood from FIG. 11, the inclined cam follower surface 930 is formed in the ROM unit 900. The inclined cam follower surface 930 is configured with the surface directed downward, and the end close to the bottle axis Ax (FIG. 9) is positioned higher, and the end away from the bottle axis Ax (FIG. 9) is positioned lower. The inclined cam follower surface 930 configures “cam follower part” in the relationship with the aforementioned body side inclined cam surface 630 of the reservoir 600, that is, the driving cam part of the body side.

<Effect of Interlocking Mechanism 700 Included in the First Embodiment>

Figure 17:
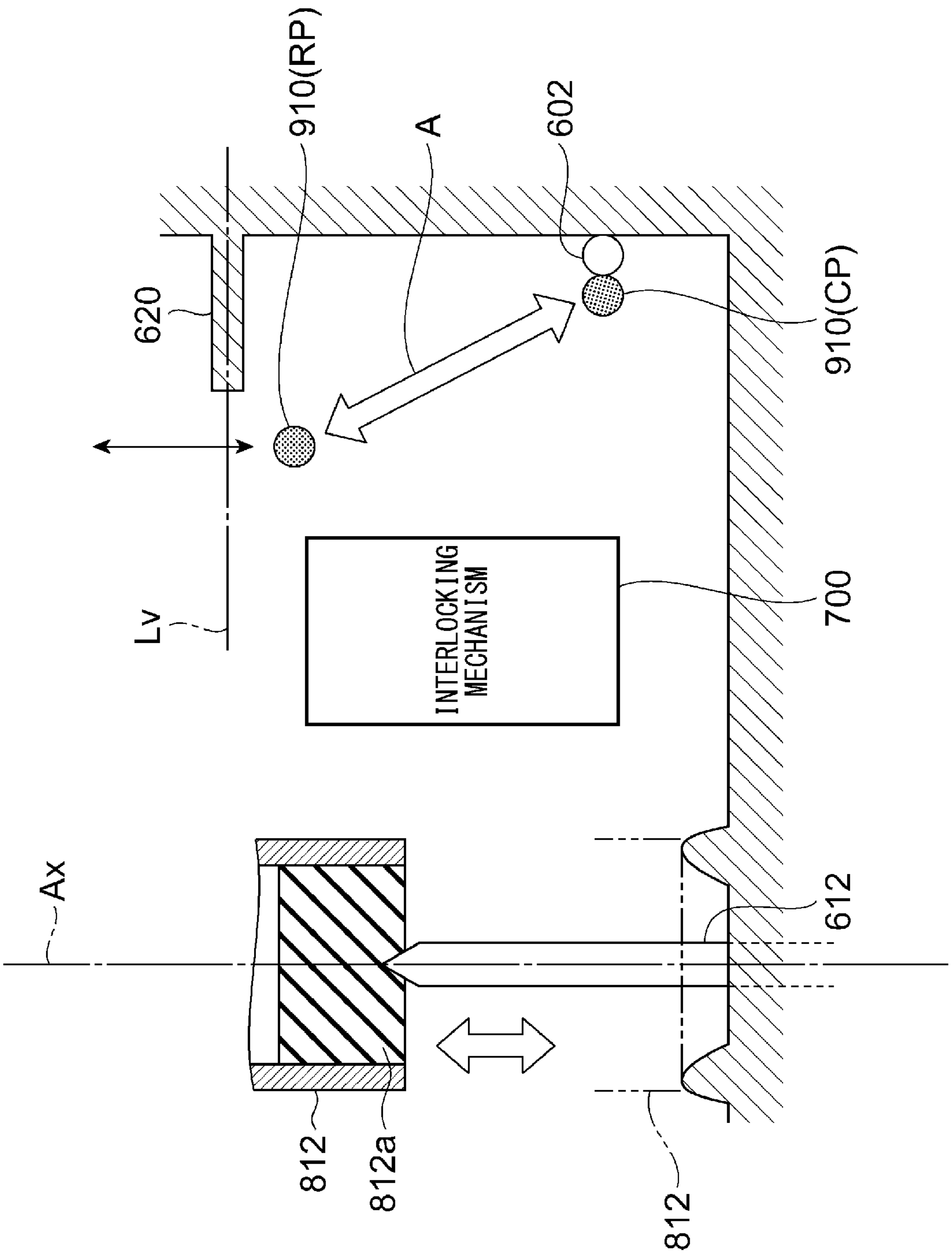
FIG. 17 is a diagram describing the state in which the terminal plate of the ROM unit is displaced between the retreat position and the contact position by interlocking with the mounting or removing operation of the cartridge in the similar manner as FIG. 16.

With reference to FIG. 17, the displacement of the terminal plate 910 in accordance with the pushing down or lifting up operations of the bottle 800 is performed by the mechanical interlocking mechanism 700 which is basically configured with the displacement guiding mechanism SL (FIGS. 8, 9, and 11), the body side inclined cam surface 630 of the reservoir 600 (FIG. 13), and the inclined cam follower surface 930 of the ROM unit 900 (FIG. 11).

FIG. 15A shows the state in which the top end of the longitudinal terminal plate 910 of the ROM unit 900 is positioned at the height level Lv of the eaves peak 620*a* of the contamination preventing eaves 620 in the process of the lowering operation of the bottle 800. In this state, the hollow needle 612 of the reservoir 600 begins to be stuck into the rubber plug 812*a* of the bottle mouth 812.

FIG. 15B shows the state in which the position of the bottle 800 is further lowered. When the bottle 800 is further lowered from the state shown in FIG. 15A, and the terminal plate 910 is positioned lower than the eaves peak 620*a*, the inclined cam follower surface 930 of the ROM unit 900 side becomes the contacting state with the body side inclined cam surface 630. Note that by pushing the bottle 800 down further from the position shown in FIG. 15A, it becomes the state in which the hollow needle 612 of the reservoir 600 is deeply stuck into the rubber plug 812*a* of the bottle mouth 812.

When the bottle 800 is further pushed down from the position shown in FIG. 15B, by the effect of the body side inclined cam surface 630 and the inclined cam follower surface 930, the ROM unit 900 is horizontally moved to the front side, that is, in the direction away from the bottle axis Ax. And, when the user further pushes the bottle 800 down to the lower end position, the hollow needle 612 of the reservoir 600 is inserted into the inside of the bottle 800, and it becomes the state in which the inside of the bottle 800 and the printer body 200 are connected. Further, in accordance with the lowering operation of the bottle 800, according to the aforementioned moving locus with reference to FIG. 16, the terminal plate 910 of the ROM unit 900 is displaced and eventually positioned at the contact position CP (FIG. 15C). With this, the terminal plate 910 of the ROM unit 900 and the reservoir terminal 602 of the body side are electrically connected.

When the user removes the empty bottle 800 by lifting up the empty bottle 800, by the effect of the mechanical interlocking mechanism 700 (FIG. 17) according to the upward movement of the bottle 800, the terminal plate 910 of the aforementioned ROM unit 900 is displaced from the contact position CP to the retreat position RP and it is positioned at the retreat position RP. The displacement to the retreat position RP is completed before reaching to the height level Lv of the eaves peak 620*a*. With this, the empty bottle 800 can be removed without interfering the terminal plate 910 of the bottle side with the contamination preventing eaves 620 of the body side.

According to the aforementioned first embodiment, with reference to FIGS. 16 and 17, when mounting the bottle 800, after the interference with the contamination preventing eaves 620 was avoided, the terminal of the ROM unit 900 side, that is, the bottle side terminal plate 910 accesses to the body side terminal, that is, the reservoir terminal 602. On the other hand, when removing the empty bottle 800, the terminal plate 910 is separated from the reservoir terminal 602, and is displaced to the retreat position RP where the interference with the contamination preventing eaves 620 can be avoided. Note that as shown in FIG. 15A, when the terminal plate 910 of the ROM unit 900 is positioned at the retreat position RP, the distance from the bottle axis Ax to the terminal plate 910 is approximately 25 mm. On the other hand, as shown in FIG. 15C, when the terminal plate 910 of the ROM unit 900 is positioned at the contact position CP, the distance from the bottle axis Ax to the terminal plate 910 is approximately 33 mm. That is, the displacement amount in which the terminal plate 910 is displaced from the retreat position RP to the contact position CP is approximately 8 mm. In other words, when the distance to the bottle axis Ax (approximately 25 mm) is set as a reference, the terminal plate 910 is displaced only approximately 30% of the distance in the direction away from the bottle axis Ax.

<Retreat Position Holding Mechanism of Terminal Plate>

With reference to FIG. 16, the contamination preventing eaves 620 is preferably a triangular-shape in the side view. That is, it is preferably that the contamination preventing eaves 620 has the eaves peak 620*a* which is the closest to the bottle axis Ax, an upper inclined surface 620*b* positioned in the upper side of the eaves peak, and a lower inclined surface 620*c* positioned in the lower side of the eaves peak. The upper inclined surface 620*b* is configured with the first inclined surface which gradually comes close to the bottle axis Ax when moving to the lower side toward the eaves peak 620*a*. The lower inclined surface 620*c* is configured with the second inclined surface which goes away from the bottle axis Ax when moving toward the lower end.

Regarding the shape of the aforementioned contamination preventing eaves 620, it is preferable that the unit body 902 has the second cam follower part 940 to the front end face of the unit body. With reference to FIG. 15A, in the second cam follower part 940, the intermediate part 940*a* is positioned at the position projecting more front than the bottle side terminal 910. That is, the intermediate part 940*a* is positioned at the position further away from the bottle axis Ax than the bottle side terminal 910.

The intermediate part 940*a* of the second cam follower part 940 extends in the vertical direction parallel to the bottle axis Ax. The second cam follower part 940 has an intermediate part 940*a* between an upper end part 940*b* and a lower end part 940*c*, and the upper end part 940*b* and the lower end part 940*c* are commonly configured with an inclined surface. The upper end part 940*b* is configured with the first inclined surface lowering the front in which the upper end is positioned closer to the bottle axis Ax than the lower end. The lower end part 940*c* is configured with the second inclined surface facing downward in which the upper end is positioned away from the bottle axis Ax more than the lower end.

In accordance with the pushing down or lifting up operations of the bottle 800, in the process of passing the terminal plate 910 through the contamination preventing eaves 620, by contacting the intermediate part 940*a* of the second cam follower part 940 with the eaves peak 620*a*, the terminal plate 910 can be held at the retreat position RP.

Further, before or after the terminal plate 910 passes through the contamination preventing eaves 620, when the ROM unit 900 is positioned in a careless position, by relatively sliding between the upper inclined surface 620*b* or the lower inclined surface 620*c* of the contamination preventing eaves 620, and the upper end part 940*b* or the lower end part 940*c* of the second cam follower part 940 of the unit body 902, the terminal plate 910 is guided, and in the process in which the terminal plate 910 passes through the contamination preventing eaves 620, the terminal plate 910 can be positioned at the retreat position RP.

More specifically, at the upper side of the contamination preventing eaves 620 shown in FIG. 16, when pushing down the bottle 800 in the state in which the terminal plate 910 is positioned at the contact position CP, the lower end part 940*c* of the second cam follower part 940 of the unit body 902 (FIG. 15A) contacts with the upper inclined surface 620*b* of the contamination preventing eaves 620. And, by sliding the lower end part 940*c* with respect to the upper inclined surface 620*b*, the terminal plate 910 moves to the retreat position RP or its vicinity (approaching to the bottle axis Ax). When further pushing down the bottle 800, the lower end part 940*c* and/or the inclined cam follower surface 930 contacts with the inclined cam surface 630. And, by sliding the lower end part 940*c* and/or the inclined cam follower surface 930 with respect to the inclined cam surface 630, the terminal plate 910 moves to the contact position CP (moving away from the bottle axis Ax). On the contrary, next, when lifting up the bottle 800, the upper end part 940*b* of the second cam follower part 940 of the unit body 902 (FIG. 15A) contacts with the lower inclined surface 620*c* of the contamination preventing eaves 620. And, by sliding the upper end part 940*b* with respect to the lower inclined surface 620*c*, the terminal plate 910 moves from the contact position CP to the retreat position RP or its vicinity (approaching to the bottle axis Ax). With this, in accordance with the pushing down or lifting up operations of the bottle 800, the terminal plate 910 can be moved to the desired position.

Note that as shown in the aforementioned first embodiment, the terminal plate 910 is held in the ROM unit 900 in the manner of enabling to be displaced to the retreat position RP and the contact position CP. Further, in order to displace the first terminal in the bottle side, that is, the terminal plate 910 by interlocking with the mounting or removing operation of the bottle 800, the lower end part 940*c* and/or the inclined cam follower surface 930 is configured with “sliding part” which slides with respect to the inclined cam surface 630 fixed to the device side. In other words, in response to the insertion amount (insertion distance) of the cartridge based on the user’s operation, the sliding part in the bottle 800 side has a function to give the moving amount, which corresponds to the operation amount of the user, to the ROM unit 900, that is, the terminal plate 910 with respect to the neck part 810. With this, the ROM unit 900, that is, the terminal plate 910 can be displaced from the retreat position RP to the contact position CP as the cartridge is inserted to the cartridge receiving part.

<The First Modified Example of Interlocking Mechanism>

Figure 18A:
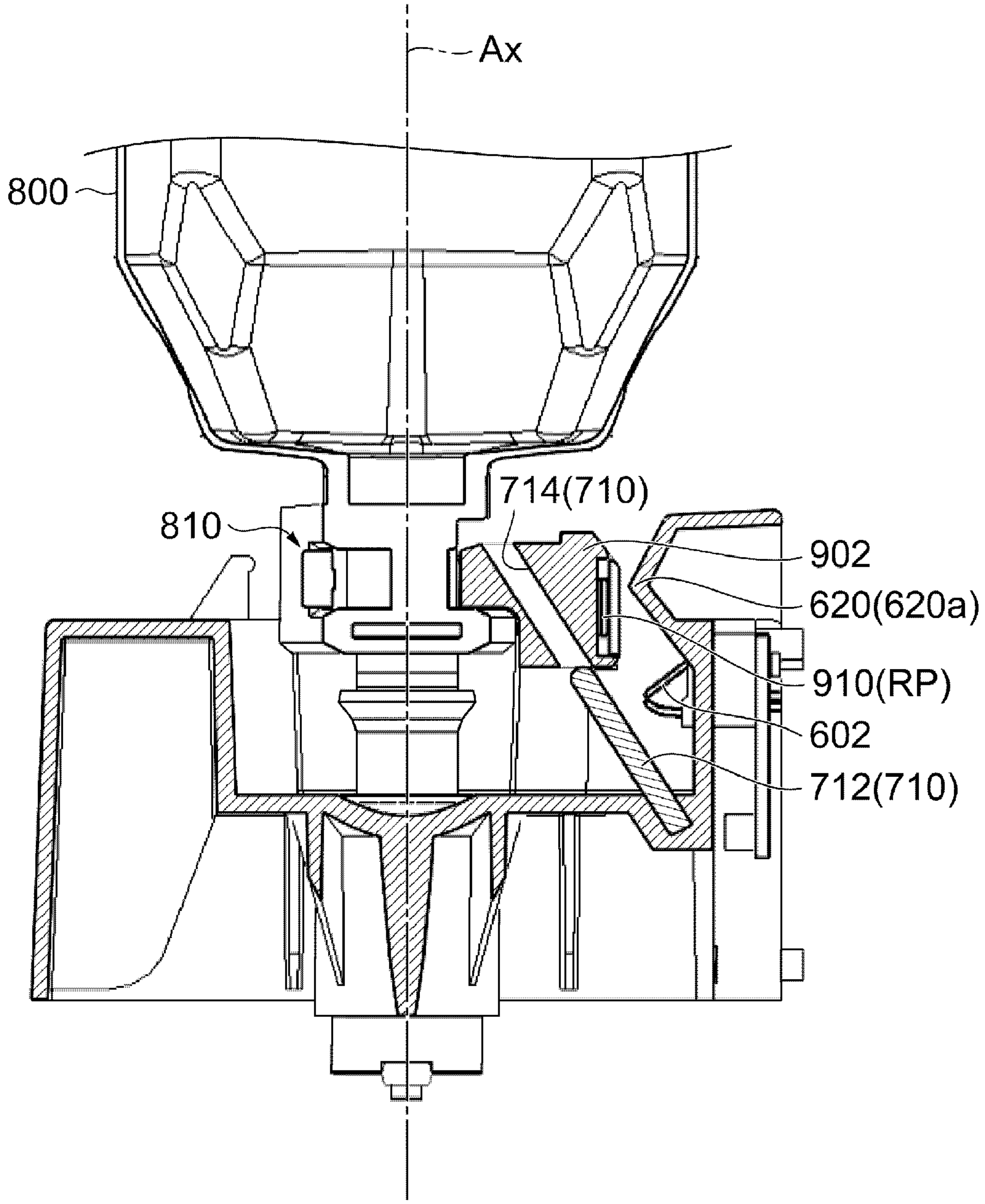
FIG. 18A is a diagram describing the first modified example of the interlocking mechanism, and the terminal plate of the ROM unit is positioned at the retreat position.
Figure 18B:
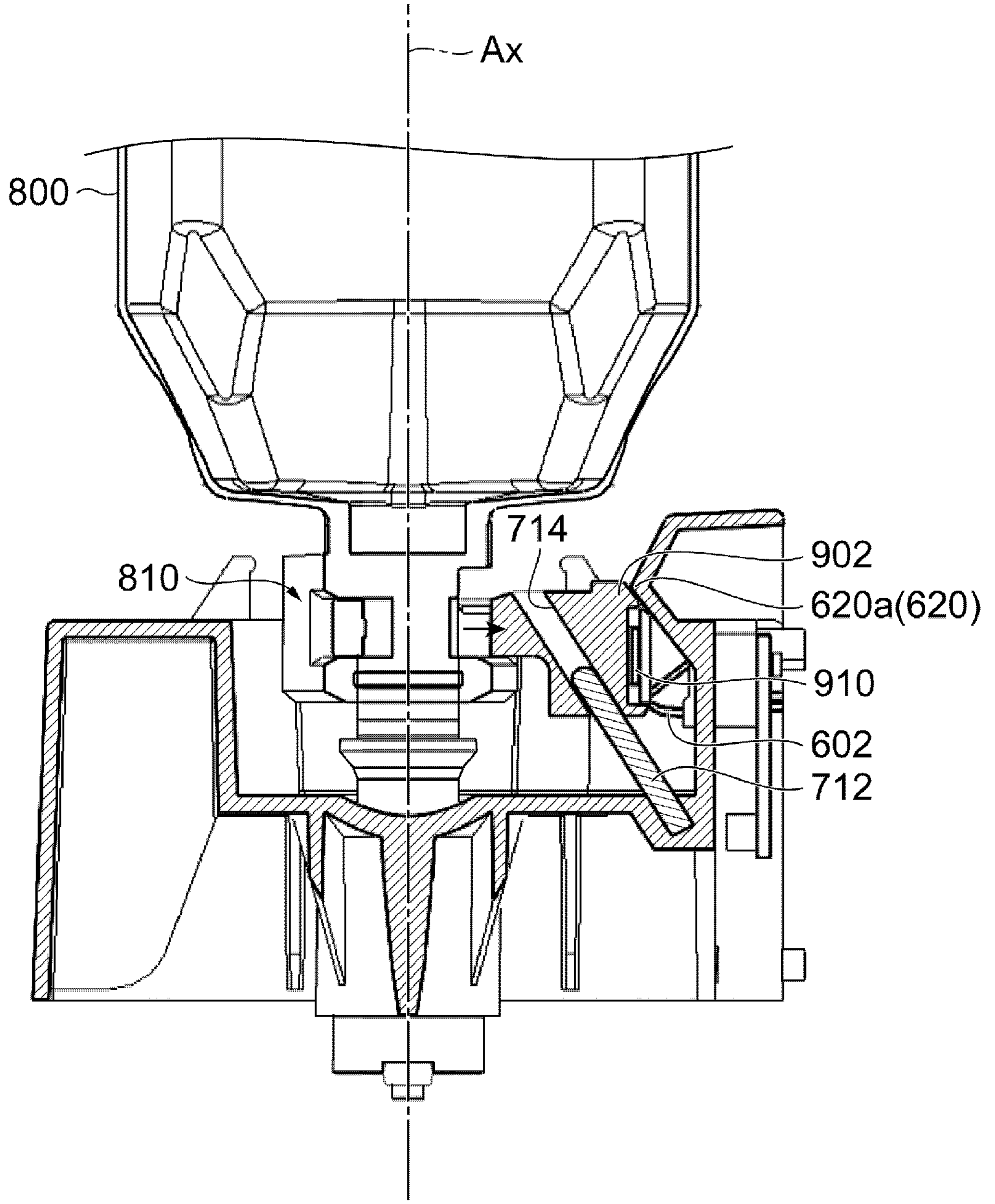
FIG. 18B is a diagram describing the first modified example of the interlocking mechanism, and the terminal plate of the ROM unit is in a halfway of the transition from the retreat position to the contact position.
Figure 18C:
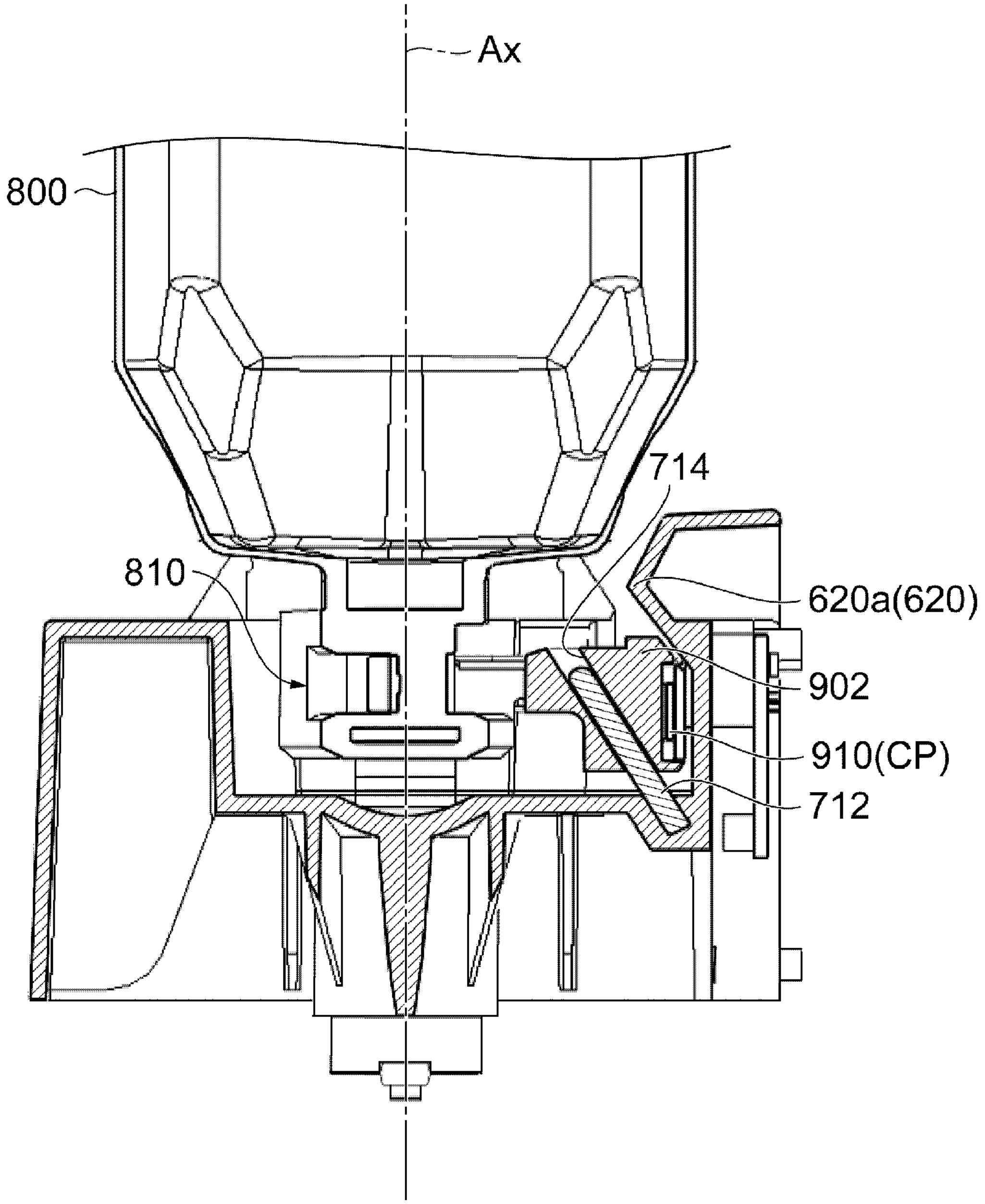
FIG. 18C is a diagram describing the first modified example of the interlocking mechanism, and the terminal plate of the ROM unit is positioned at the contact position.

With reference to FIGS. 18A to 18C, the first modified example of the aforementioned interlocking mechanism 700 will be described. The interlocking mechanism 710 of the first modified example includes an inclined pin 712 in the body side, and an inclined hole 714 in the ROM unit 900 side which receives the inclined pin. Note that the ROM unit 900 includes the displacement guiding mechanism SL (FIG. 7, etc.) which is similar to the interlocking mechanism 700 included in the first embodiment. By the displacement guiding mechanism SL, the terminal plate 910 can be positioned at the contact position CP and the retreat position RP (see FIGS. 7 and 8).

The inclined pin 712 extends obliquely upward from the bottom surface of the reservoir 600. More specifically, in the inclined pin 712, the upper end of the inclined pin is positioned relatively near the bottle axis Ax and the lower end is positioned away from the bottle axis Ax. The inclined hole 714 extends obliquely downward from the upper end. More specifically, in the inclined hole 714, the upper end of the inclined hole is positioned relatively near the bottle axis Ax, and the lower end is positioned away from the bottle axis Ax.

When the user performs the pushing down operation to the bottle 800 along the axis Ax, by interlocking with the operation, the inclined pin 712 of the printer body side is inserted into the inclined hole 714 of the ROM unit 900, and the terminal plate 910 of the retreat position RP (FIG. 18A) is displaced to the contact position CP (FIG. 18C). The state of its halfway is shown in FIG. 18B.

As described above, the inclined pin 712 of the printer body side substantially configures “body side driving cam part”, and the inclined hole 714 of the ROM unit 900 substantially configures “cam follower part”, and further, the sliding part is configured.

The timing for inserting the inclined pin 712 to the inclined hole 714 is set to the timing when the terminal plate 910 is positioned lower than the contamination preventing eaves 620. With reference to FIG. 17, with this, the state in which the terminal plate 910 contacts with the reservoir terminal 602 can be made without interfering the terminal plate 910 of the bottle side with the contamination preventing eaves 620 of the body side.

When the user lifts up the empty bottle 800 and removes the empty bottle 800, by the effect of the interlocking mechanism 710 of the first modified example in accordance with the upward movement of the bottle 800, the terminal plate 910 of the aforementioned ROM unit 900 is displaced from the contact position C and positioned to the retreat position RP. The displacement to the retreat position PR is completed before reaching to the contamination preventing eaves 620 (FIG. 17A). With this, the empty bottle 800 can be removed without interfering the terminal plate 910 of the bottle side with the contamination preventing eaves 620 of the body side.

In the interlocking mechanism 710 of the first modified example, the retreat position holding mechanism of the aforementioned terminal plate may be provided. As described above, before or after the terminal plate 910 passes through the contamination preventing eaves 620, when the ROM unit 900 is positioned in a careless position, by engaging between the upper inclined surface 620*b* or the lower inclined surface 620*c* of the contamination preventing eaves 620, and the upper end part 940*b* or the lower end part 940*c* of the second cam follower part 940 of the ROM unit 900, the terminal plate 910 is guided, and in the process in which the terminal plate 910 passes through the contamination preventing eaves 620, the terminal plate 910 can be positioned at the retreat position RP.

<The Second Modified Example of Interlocking Mechanism>

Figure 19A:
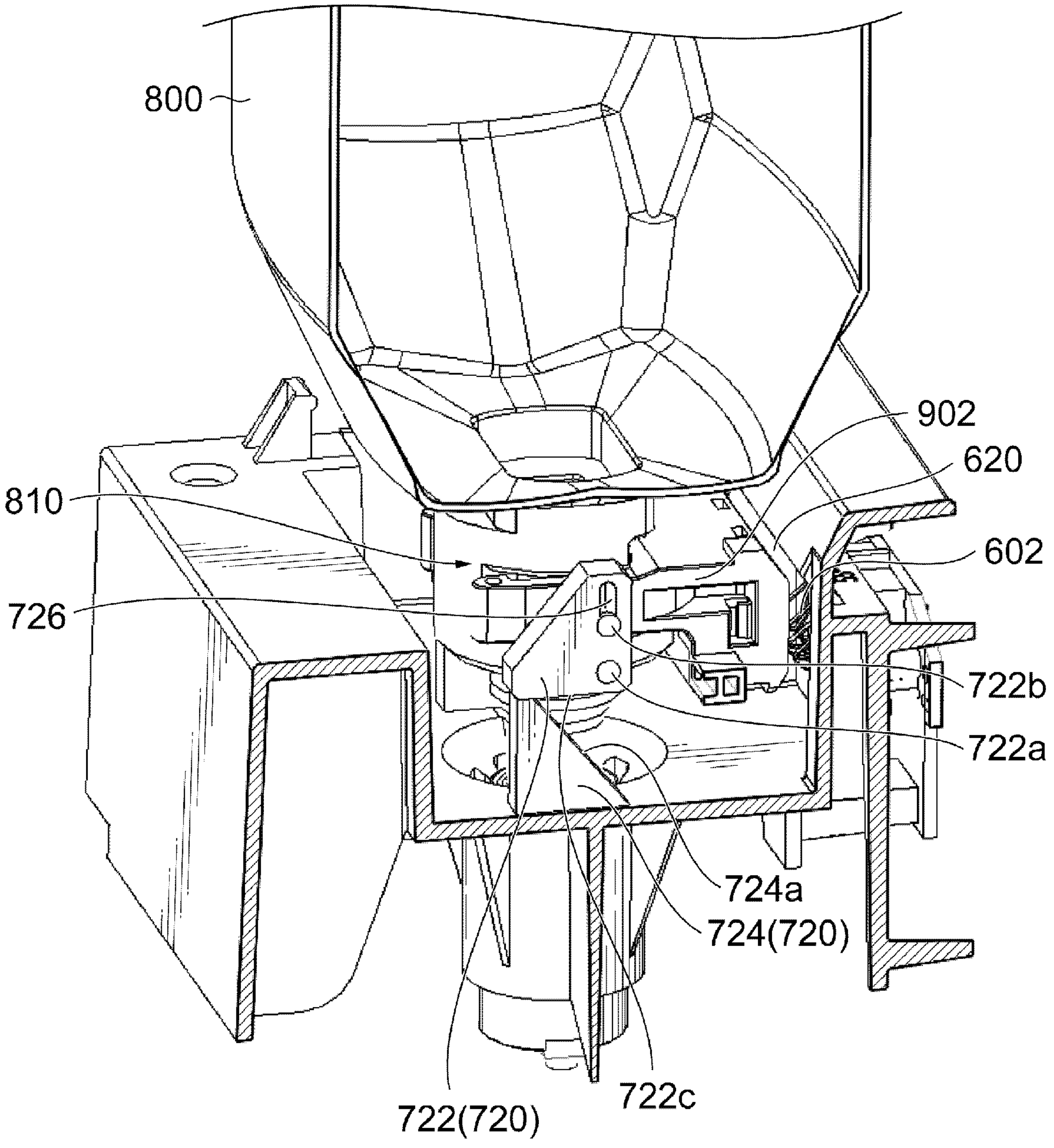
FIG. 19A is a diagram describing the second modified example of the interlocking mechanism, and the terminal plate of the ROM unit is positioned at the retreat position.

The second modified example of the interlocking mechanism 700 will be described with reference to FIGS. 19A to 19C. The interlocking mechanism 720 of the second modified example includes a link 722 and a cam projection 724. Further, the ROM unit 900 includes the displacement guiding mechanism SL (FIG. 7) which is similar to the interlocking mechanism 700 included in the first embodiment. By the displacement guiding mechanism SL, the terminal plate 910 can be positioned at the contact position CP and the retreat position RP (FIGS. 7 and 8).

The link 722 includes the first pin 722*a* fixed to the bottle 800, and is swingable around the first pin 722*a*. The link 722 has an elongated hole 726, and the second pin 722*b* inserted into the elongated hole 726 is fixed to the ROM unit 900.

The cam projection 724 is fixed to the reservoir 600 which configures a part of the printer body 200. The cam projection 724 has an inclined cam surface 724*a* lowering the front in the direction from the upper end to the lower end, and the inclined cam surface 724*a* configures the body side driving cam part 724*a*. On the other hand, in the link 722, the lower end surface 722*c* of the link configures a cam follower part.

The timing for contacting the link 722 with the cam projection 724 is set in the timing when the terminal plate 910 (not shown in FIGS. 19A to 19C due to the illustration) is positioned lower than the contamination preventing eaves 620. With reference to FIG. 17 as described above, with this, when the bottle 800 is mounted or removed, at the time of passing through the contamination preventing eaves 620, the state in which the terminal plate 910 is positioned at the retreat position RP is maintained (see FIG. 19A).

Figure 19B:
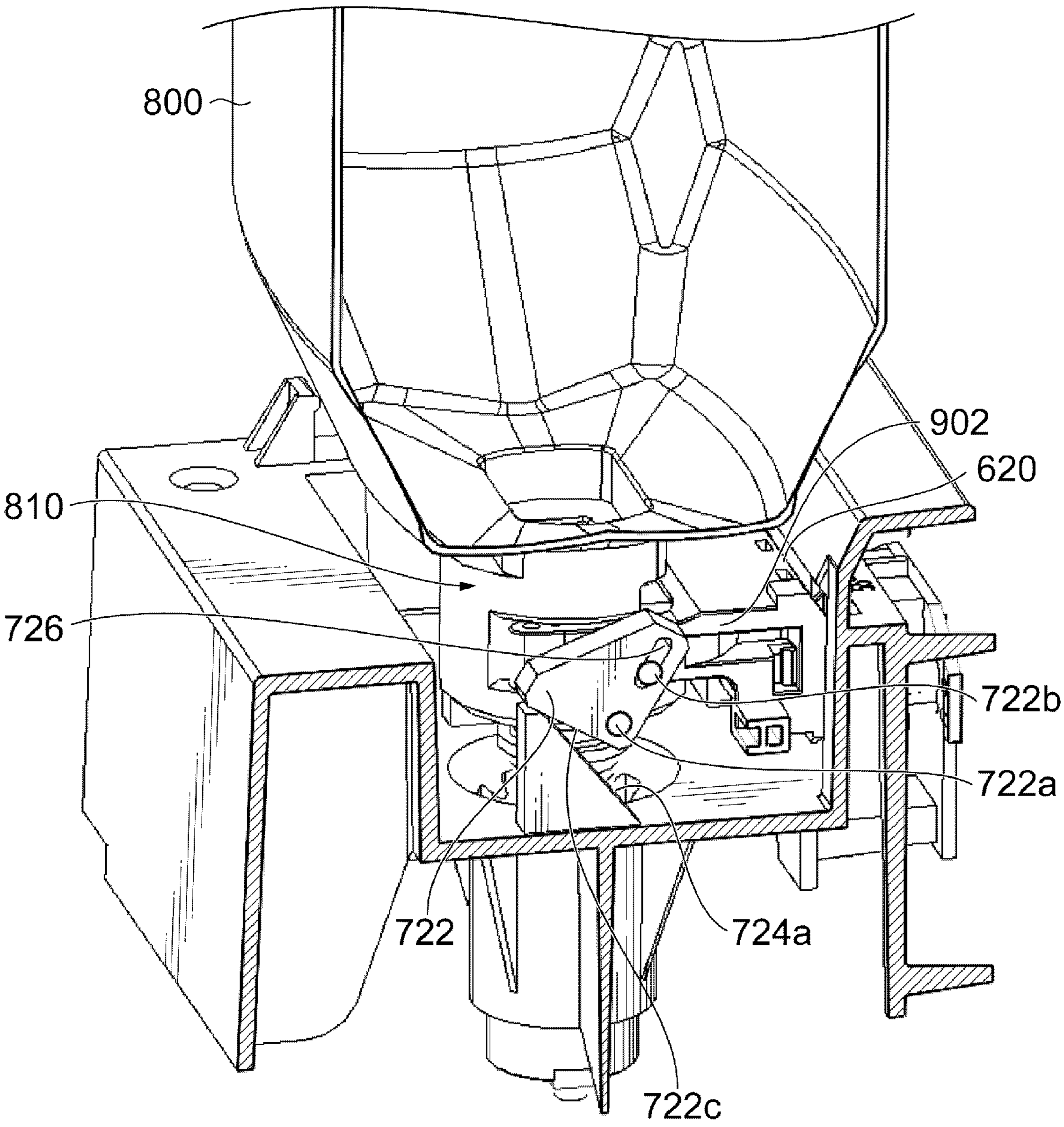
FIG. 19B is a diagram describing the second modified example of the interlocking mechanism, and the terminal plate of the ROM unit is in a halfway of the transition from the retreat position to the contact position.
Figure 19C:
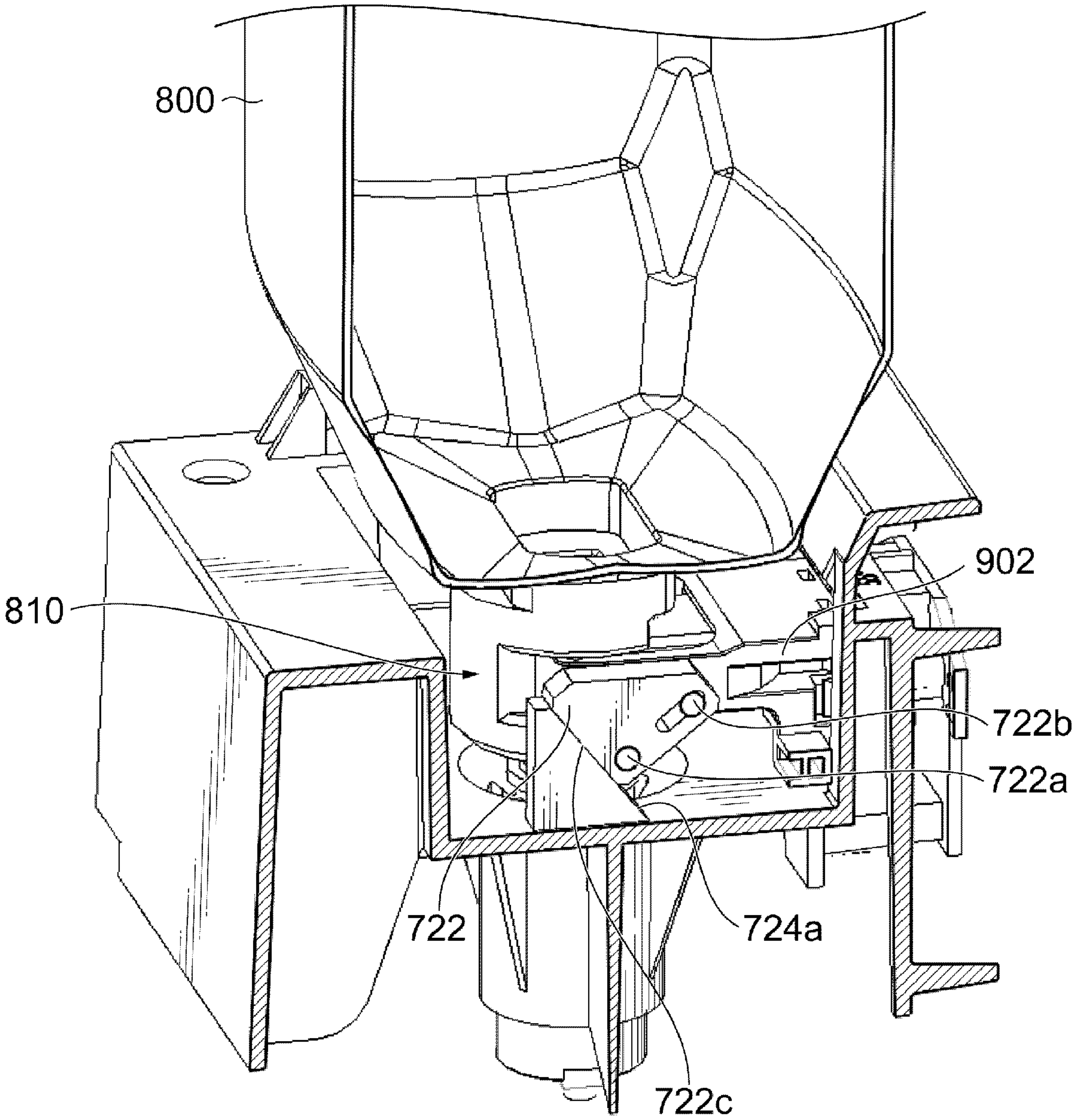
FIG. 19C is a diagram describing the second modified example of the interlocking mechanism, and the terminal plate of the ROM unit is positioned at the contact position.

When the user further pushes down the bottle 800, the link 722 starts swinging by the effect of the cam projection 724, and the ROM unit 900 is displaced toward the reservoir terminal 602 by the effect of the link 722 (FIG. 19B). And, at the time of the completion of mounting the bottle 800, it becomes the state in which the terminal plate 910 is positioned at the contact position CP (FIG. 19C).

The effect of the interlocking mechanism 720 of the second modified example is substantially the same as the interlocking mechanism 700 described with reference to FIG. 17, and by pushing down the bottle 800 along the axis Ax, the state in which the terminal plate 910 contacts with the reservoir terminal 602 can be made without interfering the terminal plate 910 of the bottle side with the contamination preventing eaves 620 of the body side.

<The Third Modified Embodiment of Interlocking Mechanism>

Figure 20A:
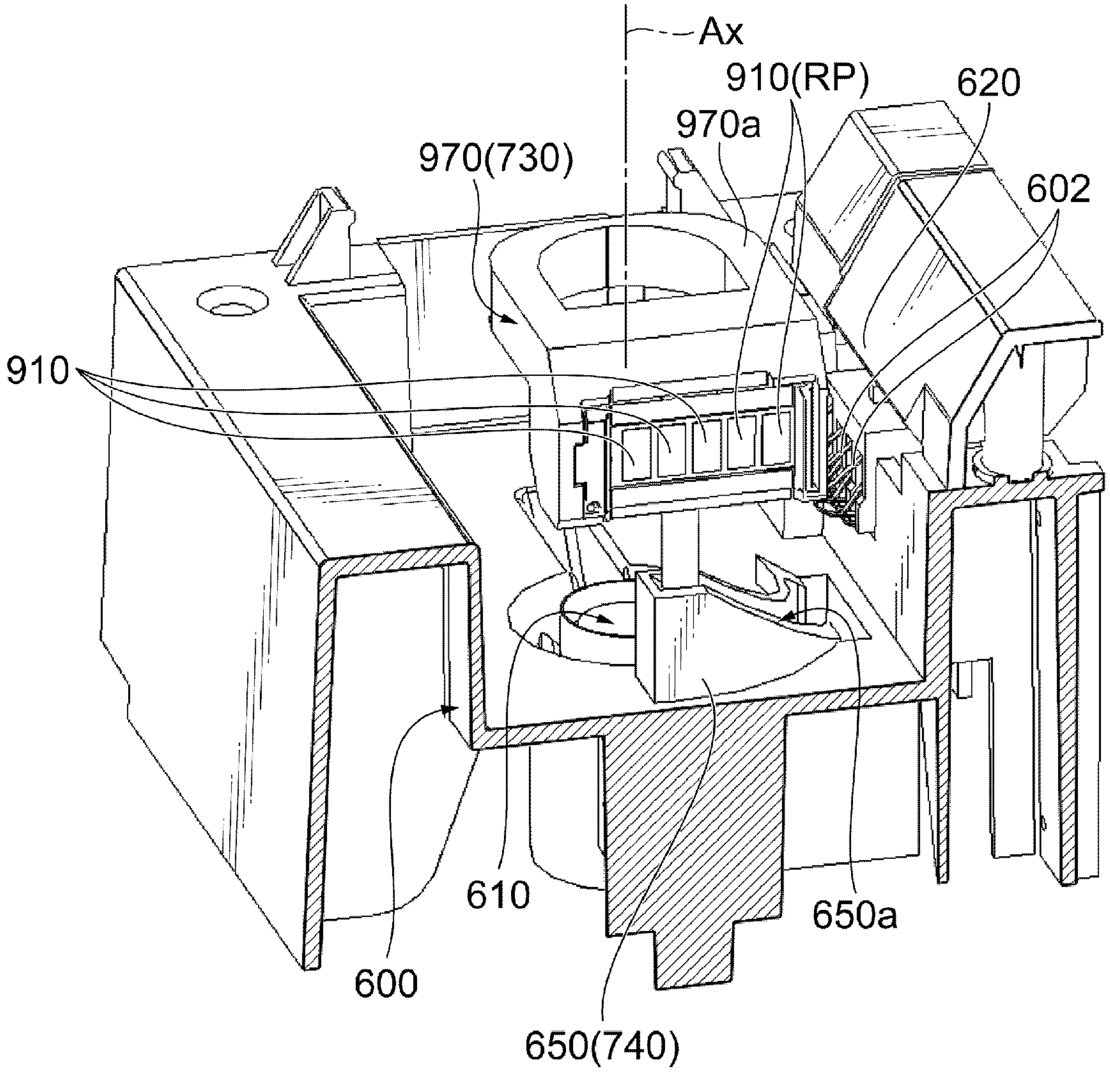
FIG. 20A is a diagram describing the third modified example of the interlocking mechanism, and the terminal plate of the ROM unit which horizontally rotates is positioned at the retreat position.
Figure 20B:
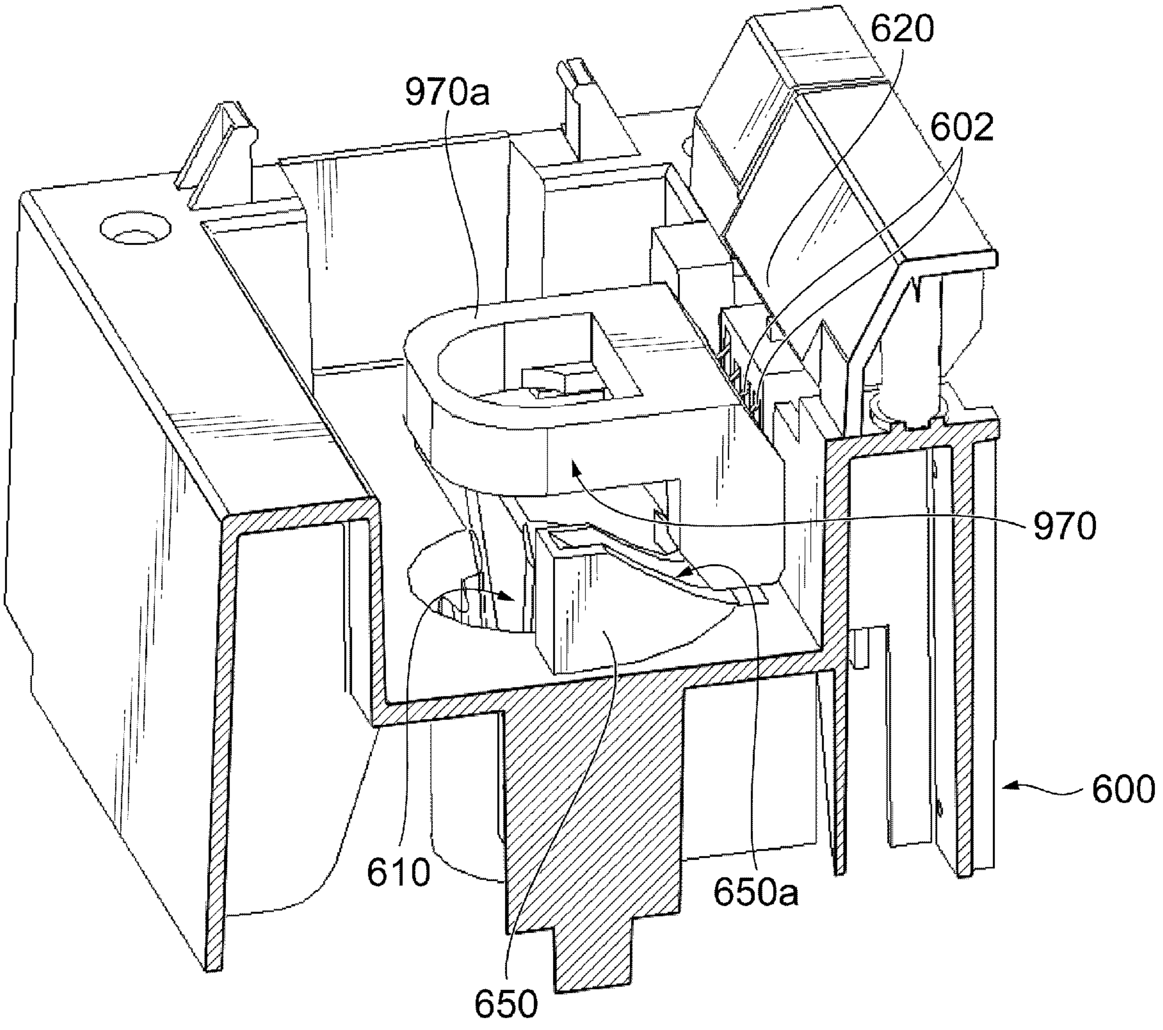
FIG. 20B is a diagram describing the third modified example of the interlocking mechanism, and the terminal plate of the ROM unit which horizontally rotates is positioned at the contact position.

The third modified example of the interlocking mechanism 700 will be described with reference to FIGS. 20A and 20B. The interlocking mechanism 730 of the third modified example (FIG. 20A) has a ROM unit 970 of a modified example, and the ROM unit 970 has a ring-shaped part 970*a*, and the ring-shaped part 970*a* is supported by the bottle neck 810 and is freely horizontally rotatable around the bottle axis Ax.

Note that the ROM unit 970 of the third modified example does not include the aforementioned displacement guiding mechanism SL (FIGS. 7 and 8, etc.).

The reservoir 600 has a cam part 650 standing around the receiving part 610 which receives the bottle mouth 812, and the cam part 650 has a driving cam surface 650*a*. The driving cam surface 650*a* is the inclined surface which becomes lower position as it approaches the reservoir terminal 602. The function of the cam follower with respect to the driving cam surface 650*a* is carried by the part of the lower surface of the ROM unit 970 of the modified example.

Before the user mounts the bottle 800 (not shown in FIGS. 20A and 20B), the terminal plate 910 of the ROM unit 970 is positioned without interfering with the contamination preventing eaves 620. That is, the ROM unit 970 is positioned at the retreat position RP. And, when the pushing down operation to the bottle 800 along the axis Ax is performed, interlocking with this operation, a part of the lower surface of the ROM unit 970 is seated on the driving cam surface 650*a* of the body side. FIG. 20A shows the state right before seating. In this state, the terminal plate 910 is already positioned in the lower side of the contamination preventing eaves 620, and positioned at the retreat position RP.

When the part of the lower surface of the ROM unit 970 is seated on the driving cam surface 650*a* of the body side, by the effect of the driving cam surface 650*a* of the reservoir 600, the ROM unit 970 is horizontally rotated around the bottle axis Ax. The rotation direction is the direction in which the terminal plate 910 accesses to the reservoir terminal 602 by the effect of the driving cam surface 650*a*. At the time that the mounting of the bottle 800 is completed, it becomes the state in which the terminal plate 910 contacts with the corresponding reservoir terminal 602 (FIG. 20B). That is, the terminal plate 910 is positioned at the contact position CP.

When the user lifts up the empty bottle 800 and removes the empty bottle 800, by the effect of the driving cam surface 650*a* of the reservoir 600, the aforementioned ROM unit 970 returns to the retreat position RP from the contact position CP by reversely rotating around the bottle axis Ax. With this, the empty bottle 800 can be removed without interfering the terminal plate 910 of the bottle side with the contamination preventing eaves 620 of the body side. Note that in the ROM unit 970, a spring for returning to the original position (FIG. 20A) may be provided.

Figure 21:
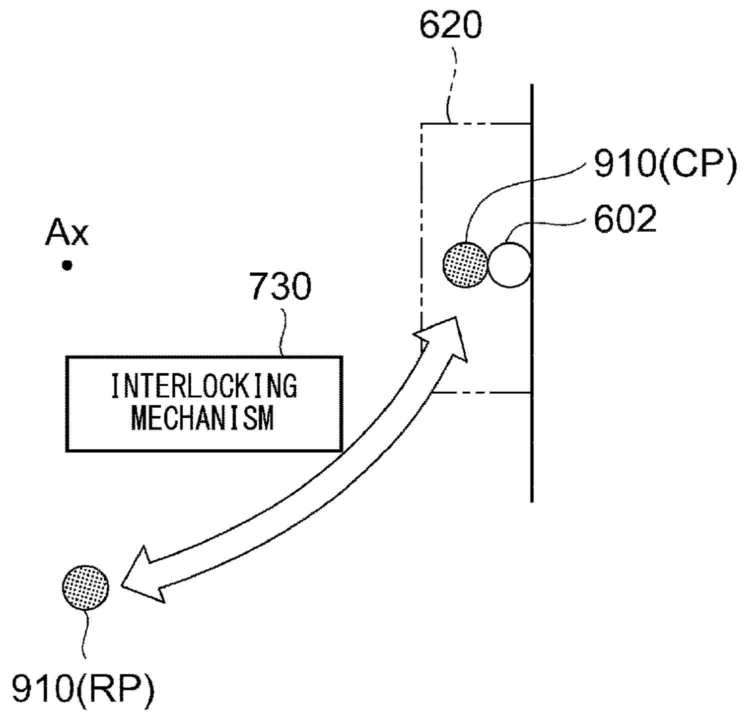
FIG. 21 is a diagram describing the state in which the terminal plate of the ROM unit is displaced between the retreat position and the contact position by interlocking with the mounting or removing operation of the cartridge by the effect of the interlocking mechanism of the third modified example.
Figure 22:
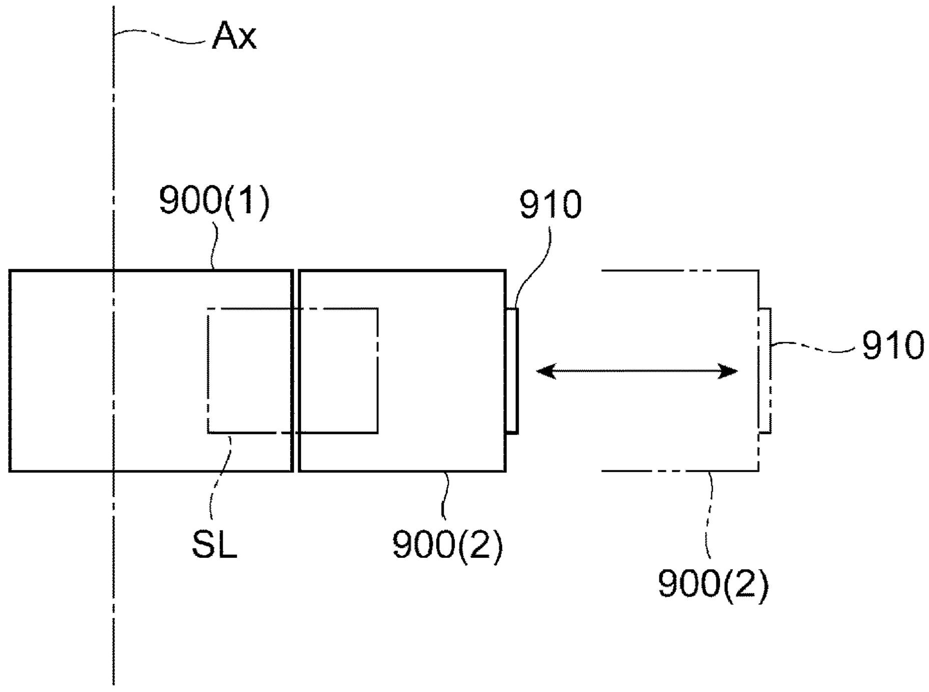
FIG. 22 is a diagram showing the cartridge according to the present invention, and describing a concept of the cartridge in which the bottle side terminal of the recording medium can be moved in parallel in the horizontal direction.

According to the interlocking mechanism 730 of the aforementioned third modified example, with reference to FIG. 21, when mounting the bottle 800, after the user positioned the ROM unit 970 at the retreat position RP, the mounting operation of the bottle 800 starts. With this, in the process of pushing down the bottle 800, the bottle side terminal plate 910 does not interfere the contamination preventing eaves 620. And, right before the completion of mounting the bottle 800, by the effect of the interlocking mechanism 730, the ROM unit 970 starts rotating around the bottle axis Ax, and the bottle side terminal plate 910 accesses to the terminal of the body side, that is, the reservoir terminal 602. And, at the time that mounting the bottle 800 is completed, the ROM unit 970 is positioned at the contact position CP. On the contrary, when removing the empty bottle 800, by the effect of the interlocking mechanism 730, the bottle side terminal plate 910 is separated from the reservoir terminal 602 by reversely rotating around the bottle axis Ax, and displaced to the retreat position RP where interfering with the contamination preventing eaves 620 can be avoided.

What is claimed is:

1. A cartridge for a continuous-type inkjet recording device, comprising:

a bottle body having an internal space configured to store ink or solvent;

a bottle neck extending along a first direction from the bottle body, and having a pipeline connecting with the internal space of the bottle body;

a guide groove provided on the bottle neck, and extending along a second direction intersecting with the first direction; and a holding part mounted on the bottle neck, and holding a recording medium recording information related to the cartridge and a first terminal electrically connected with the recording medium, wherein the holding part comprises an arm part moving the first terminal along the second direction by slidably moving along the second direction, and the arm part is slidably engaged with the guide groove along the second direction in a state in which the arm part is received to the guide groove.

2. The cartridge according to claim 1, wherein the holding part displaces the first terminal along the second direction from a first position to a second position which separates a distance larger than a distance of the first position with respect to the bottle neck.

3. The cartridge according to claim 1, wherein the arm part includes a pair of arm parts, and the end part of the pair of arm parts has a slip-off preventing projection.

4. The cartridge according to claim 1, wherein the bottle neck has a guide rod extending in the second direction, and the holding part has a recess into which the guide rod is slidably received.

5. The cartridge according to claim 1, wherein the cartridge is inserted along the first direction into a cartridge receiving part provided in the continuous-type inkjet recording device, the holding part has a sliding part configured to contact to a part of the cartridge receiving part and relatively slide with respect to the cartridge receiving part, and the sliding part displaces the holding part along the second direction with respect to the bottle neck in accordance with movement of the cartridge along the first direction.

6. The cartridge according to claim 5, wherein
the holding part has a first portion holding the first terminal and the recording medium, and a second portion comprising the arm part, and
the sliding part is provided in the first portion.

7. The cartridge according to claim 6, wherein
the sliding part slides with respect to an inclined cam surface fixed to the cartridge receiving part.

8. The cartridge according to claim 7, wherein
the sliding part includes an upper end part and a lower end part, the upper end part used when the cartridge is removed from the cartridge receiving part and the lower end part used when the cartridge is inserted into the cartridge receiving part.

9. The cartridge according to claim 6, wherein
the first portion and the second portion are integrally molded.

10. The cartridge according to claim 5, wherein
the sliding part is an inclined hole provided in the holding part, the inclined hole receiving an inclined pin provided in the cartridge receiving part.

11. The cartridge according to claim 1, wherein
the first terminal is accessed by the continuous-type inkjet recording device.

12. The cartridge according to claim 11, wherein
the first terminal is positioned at a contact position contacting with a reservoir terminal provided in the cartridge receiving part, and at a retreat position preventing from interfering with a contamination preventing eaves positioned above the reservoir terminal.

13. A cartridge for a continuous-type inkjet recording device, comprising:
a bottle body forming an internal volume configured to store ink or solvent;
a bottle neck extending along a first direction from the bottle body, and forming an internal path connected with the internal volume of the bottle body, and a distal end of the bottle neck being sealed;
a holder mounted on the bottle neck, and holding a recording medium related to the cartridge and a first terminal electrically connected with the recording medium such that the first terminal is accessible from a second direction different from the first direction; and
a guide disposed on the bottle neck, and guiding the holder such that the holder linearly slides along the second direction, wherein
the holder is slidably engaged with the guide along the second direction in a state in which the holder is received to the guide.

14. The cartridge according to claim 13, wherein
the second direction is orthogonal to the first direction.

15. The cartridge according to claim 13, wherein
the recording medium records information related to the cartridge.

16. The cartridge according to claim 13, wherein
the holder includes a couple of arms, the guide includes a guide groove corresponding to the couple of arms.

17. The cartridge according to claim 13, wherein
the recording medium related to the cartridge and the first terminal are mounted on a terminal plate, and the first terminal faces to the second direction.

18. The cartridge according to claim 13, wherein
the internal path receives along the first direction a needle included in a continuous-type inkjet recording device.

19. A bottle for a continuous-type inkjet recording device, comprising:
a bottle body having an internal space configured to store ink or solvent;
a bottle neck extending along a first direction from the bottle body, and having a pipeline connecting with the internal space of the bottle body and an opening at a distal end; and
a guide groove formed on the bottle neck, and having an elongated shape along a second direction intersecting with the first direction to guide an arm of an attachment such that the attachment slidably moves along the second direction, wherein
the guide groove guides the arm of the attachment such that the arm is slidably engaged with the guide groove along the second direction in a state in which the arm is received to the guide groove.

* * * * *